(12) United States Patent
Mayfield et al.

(10) Patent No.: US 11,916,984 B2
(45) Date of Patent: *Feb. 27, 2024

(54) SYSTEM AND METHODS FOR RUNNING CONFERENCE APPLICATIONS BEFORE, DURING, AND AFTER A NETWORK CONFERENCE

(71) Applicant: Zoom Video Communications, Inc., San Jose, CA (US)

(72) Inventors: Ross Douglas Mayfield, San Jose, CA (US); Yoshifumi Takebuchi, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,753

(22) Filed: May 10, 2023

(65) Prior Publication Data
US 2023/0283648 A1    Sep. 7, 2023

Related U.S. Application Data

(63) Continuation of application No. 17/334,494, filed on May 28, 2021, now Pat. No. 11,695,811, which is a continuation of application No. 17/069,750, filed on Oct. 13, 2020, now Pat. No. 11,050,802.

(51) Int. Cl.
*H04L 65/403* (2022.01)
*H04L 67/02* (2022.01)
*H04L 67/01* (2022.01)

(52) U.S. Cl.
CPC ............ *H04L 65/403* (2013.01); *H04L 67/01* (2022.05); *H04L 67/02* (2013.01)

(58) Field of Classification Search
None
See application file for complete search history.

(56) References Cited

U.S. PATENT DOCUMENTS

| | | | |
|---|---|---|---|
| 6,038,602 A * | 3/2000 | Ishikawa | H04M 7/122 709/227 |
| 6,182,073 B1 | 1/2001 | Kukkal | |
| 6,691,154 B1 | 2/2004 | Zhu et al. | |
| 7,472,162 B2 | 12/2008 | Thompson et al. | |
| 8,234,335 B1 | 7/2012 | Haldar et al. | |

(Continued)

OTHER PUBLICATIONS

"What Are the Attendee Controls?", Available Online at URL: https://support.zoom.us/hc/en-us/articles/200941109-What-Are-the-Attendee-Controls-, Jan. 29, 2015, 2 pages.

(Continued)

*Primary Examiner* — Quang N Nguyen
(74) *Attorney, Agent, or Firm* — Kilpatrick Townsend & Stockton LLP

(57) ABSTRACT

System and methods for running conference applications before, during, and after a network conference. In an embodiment, a method is provided for running a conference application before joining a network conference. The method includes activating a client application, selecting a conference application from a plurality of conference applications, running the conference application from the client application before joining a network conference, and joining the network conference using the client application.

17 Claims, 18 Drawing Sheets

(56) References Cited

U.S. PATENT DOCUMENTS

| | | |
|---|---|---|
| 8,576,750 B1 | 11/2013 | Hecht et al. |
| 8,605,132 B1 | 12/2013 | Swanson et al. |
| 9,503,683 B2 | 11/2016 | Dunn et al. |
| 9,774,746 B1 | 9/2017 | Sennett et al. |
| 9,843,606 B1 | 12/2017 | Vendrow et al. |
| 10,171,521 B2 | 1/2019 | Sall |
| 10,936,648 B2 | 3/2021 | Sivaji et al. |
| 10,970,925 B2 | 4/2021 | Lang et al. |
| 11,037,565 B2 | 6/2021 | Kudurshian et al. |
| 11,050,802 B1 | 6/2021 | Mayfield et al. |
| 11,089,134 B1 | 8/2021 | Gordon et al. |
| 11,363,079 B2 | 6/2022 | Mayfield et al. |
| 11,425,176 B2 | 8/2022 | Mayfield et al. |
| 11,520,928 B2 | 12/2022 | Brannon et al. |
| 11,695,811 B2 | 7/2023 | Mayfield et al. |
| 2002/0032730 A1 | 3/2002 | Amit et al. |
| 2007/0174384 A1 | 7/2007 | Abd-El-Malek et al. |
| 2007/0185956 A1 | 8/2007 | Ogle et al. |
| 2007/0276947 A1 | 11/2007 | Panattu et al. |
| 2009/0158430 A1 | 6/2009 | Borders |
| 2010/0235787 A1 | 9/2010 | Couse et al. |
| 2010/0257451 A1 | 10/2010 | Halevi et al. |
| 2010/0262925 A1 | 10/2010 | Liu et al. |
| 2010/0318940 A1 | 12/2010 | Stevens et al. |
| 2011/0197148 A1 | 8/2011 | Rhee et al. |
| 2011/0270922 A1 | 11/2011 | Jones et al. |
| 2011/0271210 A1 | 11/2011 | Jones et al. |
| 2011/0304686 A1 | 12/2011 | Qiu et al. |
| 2012/0011205 A1 | 1/2012 | Paulsami et al. |
| 2012/0023407 A1 | 1/2012 | Taylor |
| 2012/0110446 A1 | 5/2012 | Kunieda |
| 2013/0066974 A1 | 3/2013 | Yoakum et al. |
| 2013/0145284 A1 | 6/2013 | Anantharaman et al. |
| 2014/0032677 A1 | 1/2014 | Pittenger et al. |
| 2014/0108557 A1 | 4/2014 | Calman et al. |
| 2014/0211929 A1 | 7/2014 | Krishnan et al. |
| 2014/0267571 A1 | 9/2014 | Periyannan et al. |
| 2014/0289646 A1 | 9/2014 | Munir |
| 2014/0313278 A1 | 10/2014 | Periyannan et al. |
| 2015/0002615 A1 | 1/2015 | Yasoshima |
| 2015/0149532 A1 | 5/2015 | Kumashio |
| 2015/0149586 A1 | 5/2015 | Saito |
| 2016/0065742 A1 | 3/2016 | Nasir et al. |
| 2016/0182673 A1 | 6/2016 | Kinarti et al. |
| 2016/0191577 A1 | 6/2016 | Inagaki |
| 2016/0226871 A1 | 8/2016 | Stephure et al. |
| 2017/0149707 A1 | 5/2017 | Hattar et al. |
| 2018/0097951 A1 | 4/2018 | Nagai |
| 2018/0109634 A1 | 4/2018 | Lawson et al. |
| 2018/0121217 A1 | 5/2018 | Jarabek et al. |
| 2018/0139253 A1 | 5/2018 | Ruetschi et al. |
| 2019/0166330 A1 | 5/2019 | Ma et al. |
| 2019/0272141 A1 | 9/2019 | Poel et al. |
| 2019/0303879 A1 | 10/2019 | Mankovskii et al. |
| 2019/0312918 A1 | 10/2019 | Balasaygun et al. |
| 2019/0379712 A1 | 12/2019 | Mota et al. |
| 2020/0044998 A1 | 2/2020 | Jeon et al. |
| 2020/0112450 A1 | 4/2020 | Chhabra et al. |
| 2021/0042314 A1 | 2/2021 | Batlle et al. |
| 2021/0200431 A1 | 7/2021 | Xiao et al. |
| 2022/0116431 A1 | 4/2022 | Mayfield et al. |
| 2022/0116434 A1 | 4/2022 | Mayfield et al. |
| 2022/0308716 A1* | 9/2022 | Rice ................ G06F 3/0481 |
| 2022/0417047 A1* | 12/2022 | Foufa ................ G06N 20/00 |
| 2023/0028611 A1 | 1/2023 | Houser et al. |
| 2023/0141437 A1 | 5/2023 | Mayfield et al. |
| 2023/0273720 A1* | 8/2023 | Silverstein ............ G06F 3/0483 715/753 |

OTHER PUBLICATIONS

U.S. Appl. No. 17/069,620, "Final Office Action", dated Feb. 1, 2023, 17 pages.

U.S. Appl. No. 17/069,620, "Non-Final Office Action", dated Jul. 13, 2022, 17 pages.

U.S. Appl. No. 17/069,658, "Advisory Action", dated Nov. 26, 2021, 5 pages.

U.S. Appl. No. 17/069,658, "Final Office Action", dated Jul. 18, 2022, 20 pages.

U.S. Appl. No. 17/069,658, "Final Office Action", dated Sep. 20, 2021, 18 pages.

U.S. Appl. No. 17/069,658, "Non-Final Office Action", dated Feb. 2, 2023, 10 pages.

U.S. Appl. No. 17/069,658, "Non-Final Office Action", dated Jan. 4, 2022, 19 pages.

U.S. Appl. No. 17/069,718, "Final Office Action", dated Aug. 9, 2021, 11 pages.

U.S. Appl. No. 17/069,718, "Notice of Allowance", dated Apr. 14, 2022, 5 pages.

U.S. Appl. No. 17/069,718, "Notice of Allowance", dated Jan. 7, 2022, 5 pages.

U.S. Appl. No. 17/069,718, "Notice of Allowance", dated Nov. 30, 2021, 14 pages.

U.S. Appl. No. 17/069,774, "Final Office Action", dated May 26, 2022, 13 pages.

U.S. Appl. No. 17/069,774, "Non-Final Office Action", dated Nov. 23, 2021, 13 pages.

U.S. Appl. No. 17/069,774, "Non-Final Office Action", dated Sep. 23, 2022, 13 pages.

U.S. Appl. No. 17/069,787, "Non-Final Office Action", dated Aug. 19, 2021, 9 pages.

U.S. Appl. No. 17/069,787, "Notice of Allowance", dated Jan. 26, 2022, 9 pages.

U.S. Appl. No. 17/334,494, "Non-Final Office Action", dated Aug. 1, 2022, 16 pages.

U.S. Appl. No. 17/334,494, "Notice of Allowance", dated Dec. 28, 2022, 9 pages.

U.S. Appl. No. 17/334,494, "Notice of Allowance", dated Mar. 24, 2023, 8 pages.

PCT App. No. PCT/US2021/053683, "International Preliminary Report on Patentability", dated Apr. 27, 2023, 7 pages.

PCT App. No. PCT/US2021/053683, "International Search Report and Written Opinion", dated Jan. 27, 2022, 10 pages.

U.S. Appl. No. 17/069,620, "Non-Final Office Action", dated Aug. 18, 2023, 19 pages.

U.S. Appl. No. 17/069,658, "Notice of Allowance", dated Jul. 26, 2023, 5 pages.

U.S. Appl. No. 17/069,658, "Notice of Allowance", dated Nov. 8, 2023, 5 pages.

U.S. Appl. No. 17/069,774, "Final Office Action", dated Aug. 31, 2023, 17 pages.

U.S. Appl. No. 17/721,921, "Notice of Allowance", dated Sep. 18, 2023, 8 pages.

U.S. Appl. No. 17/863,950, "Final Office Action", dated Aug. 17, 2023, 12 pages.

U.S. Appl. No. 17/863,950, "Non-Final Office Action", dated May 8, 2023, 9 pages.

* cited by examiner

CONFERENCE SYSTEM WITH APPLICATION SUPPORT (CSAS)

CSAS FUNCTIONS

SYSTEM AND METHODS FOR RUNNING CONFERENCE APPLICATIONS BEFORE, DURING, AND AFTER A NETWORK CONFERENCE

CROSS REFERENCE TO RELATED APPLICATIONS

This patent application is a continuation patent application of a co-pending, commonly-owned U.S. patent application Ser. No. 17/334,494, filed May 28, 2021, which is a continuation patent application of commonly-owned U.S. Pat. No. 11,050,802, filed on Oct. 13, 2020, the entire disclosure of both of which is hereby incorporated herein by reference in its entirety.

The present application contains subject matter that may be related to the subject matter in U.S. patent application Ser. No. 17/069,620, entitled "SYSTEM AND METHODS FOR PROVIDING CONFERENCE APPLICATIONS DURING A NETWORK CONFERENCE" filed on Oct. 13, 2020 and assigned to the assignee of the present application.

The present application also contains subject matter which may be related to the subject matter in U.S. patent application Ser. No. 17/069,658, entitled "SYSTEM AND METHODS FOR SHARING A SCREEN SHOT OF A CONFERENCE APPLICATION DURING A NETWORK CONFERENCE" filed on Oct. 13, 2020 and assigned to the assignee of the present application.

The present application also contains subject matter which may be related to the subject matter in U.S. patent application Ser. No. 17/069,718, entitled "SYSTEM AND METHODS FOR TRANSMITTING CONFERENCE APPLICATION CONTENT DURING A NETWORK CONFERENCE" filed on Oct. 13, 2020 and assigned to the assignee of the present application.

The present application also contains subject matter which may be related to the subject matter in U.S. patent application Ser. No. 17/069,774, entitled "SYSTEM AND METHODS FOR ASSOCIATING CONFERENCE APPLICATION CONTENT WITH AN INSTANCE OF A NETWORK CONFERENCE" filed on Oct. 13, 2020 and assigned to the assignee of the present application.

The present application also contains subject matter which may be related to the subject matter in U.S. patent application Ser. No. 17/069,787, entitled "SYSTEM AND METHODS FOR RECORDING CONFERENCE APPLICATION ACTIVITY ASSOCIATED WITH A NETWORK CONFERENCE" filed on Oct. 13, 2020 and assigned to the assignee of the present application.

FIELD

The exemplary embodiments of the present invention relate to the field of network communication. More specifically, the exemplary embodiments of the present invention relate to conference system with application support.

BACKGROUND

With the increasing popularity of digital electronics and network communications, real-time interactive network conferences (or meetings) have become more popular. For example, network conferencing now allows people to communicate with each other from remote locations to exchange audio and video in real time.

During a network conference, each meeting attendee can transmit video and audio signals to other attendees. A typical conferencing system is configured with a camera that captures an image of a conference attendee and transmits this image to other attendees. Typically, attendee are limited to using functionality provided by the conferencing system. For example, the conferencing system may provide a chat mode in which conference attendees can chat by exchanging text messages during a conference. However, it is desirable to provide greater functionality during a network conference to conference attendees to increase productivity and enhance user experience.

SUMMARY

In various embodiments, a conference system with application support (CSAS) is provided. In an embodiment, the CSAS utilizes a client application that allow conference attendees to exchange audio and video information over a communication network. The client application is configured to install and run conference applications that provide a wide range of functionality to the conference attendees. The conference applications can be proprietary to the conference system or produced by third parties. During operation, an attendee can run a conference application to provide a variety of functionally before, during, and after a network conference.

In an embodiment, a method is provided for running a conference application before joining a network conference. The method includes activating a client application, selecting a conference application from a plurality of conference applications, running the conference application from the client application before joining a network conference, and joining the network conference using the client application.

In an embodiment, an apparatus is provided for running a conference application before joining a network conference. The apparatus comprises a processor configured to activate a client application, select a conference application from a plurality of conference applications, run the conference application from the client application before joining a network conference, and join the network conference using the client application.

In an embodiment, a non-transitory computer readable medium is provided on which are stored program instructions that, when executed by one or more processors, cause the one or more processors to perform operations of: activating a client application; selecting a conference application from a plurality of conference applications; running the conference application from the client application before joining a network conference; and joining the network conference using the client application.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
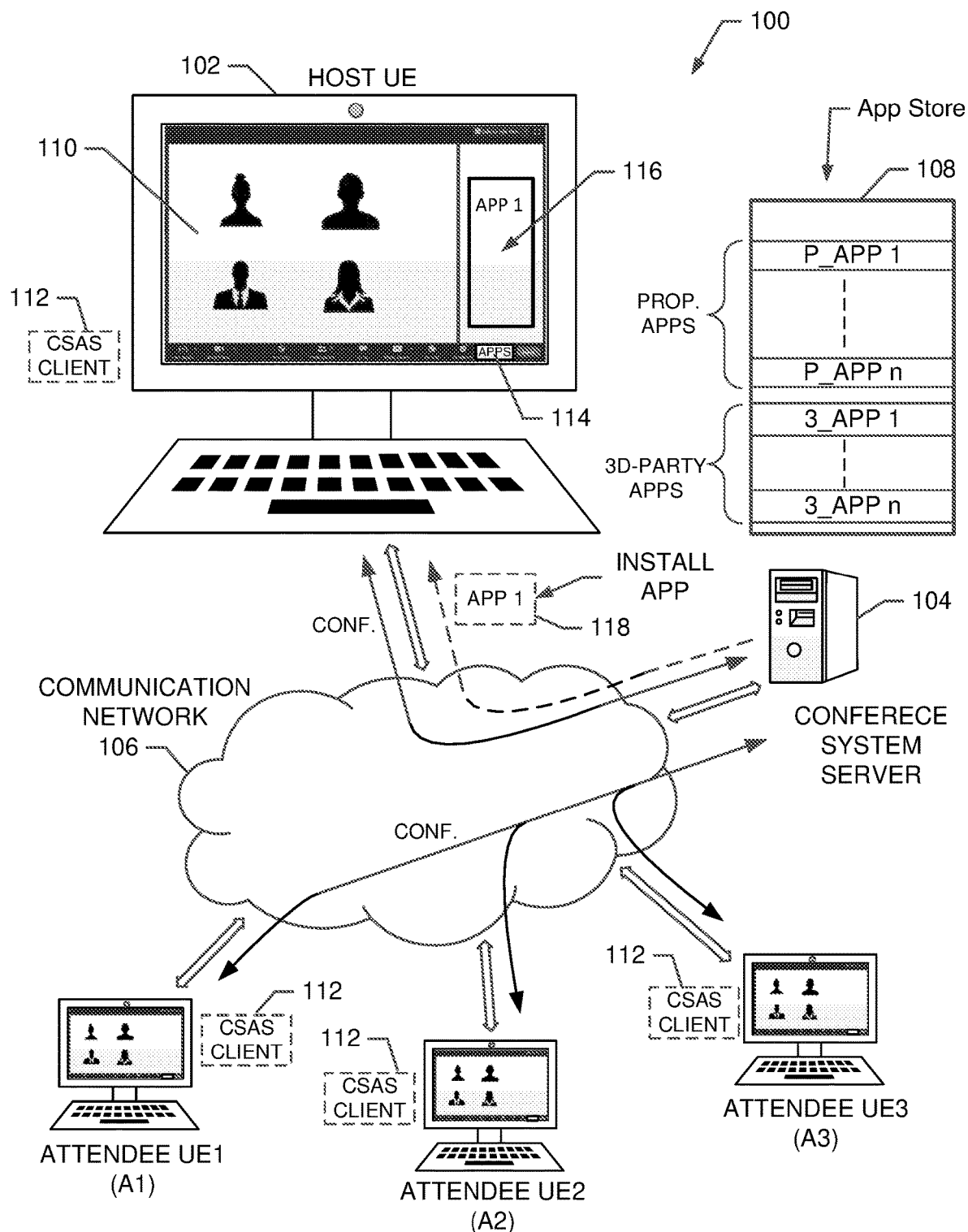
FIG. 1 shows a diagram illustrating an exemplary embodiment of a conference system with application support.

Embodiments of the present invention disclose systems, methods, and apparatus for providing a network conference system with application support.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine or computer for execution. The instructions may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a diagram of a communication network 100 that illustrates an exemplary embodiment of a conference system with application support (CSAS). The communication network 100 comprises first user equipment 102, which is referred to as a host UE that acts as a host for the network conference. The network 100 also comprises attendee user equipment (A1-A3) that participant in the network conference. The conference participants (e.g., host 102 and attendees (A1-A3)) are configured to communicate with each other utilizing a conference system server 104 and communication network 106. In an embodiment, the conference server 104 stores a plurality of conference applications 108 as part of a conference application store (App store). The applications 108 comprises proprietary and third-party applications that can be purchased or licensed for use during a network conference. In an embodiment, the communication network 106 comprises a wired communication network, a wireless communication network, or a combination of wired and wireless communication networks.

The host 102 and attendee UE (A1-A3) run a CSAS client 112 that provides the function of a conference system with application support as described herein. During a conference, the host 102 and attendees (A1-A3) communicate with each other through the system server 104 and communication network 106. The CSAS client 112 provides a conference display 110 in which the conference participants can see each other's video streams on their own system.

In an embodiment, the user of the host 102 can select an application selector (or button) 114 on the display 110 that will open a directory of conference applications that are installed on the host 102. In another embodiment, the user of the host 102 can access the application store 108 and install any of the available applications. For example, the application 118 can be obtained from the application store 108 and installed on the host 102. The user then selects one or more applications to run, and the selected applications open dialog windows that appear in a right sidebar of the display. For example, the application 116 has been selected and runs during the conference. The user can then interact with the application 116 during the conference to perform functions, such as note taking, document creation, spreadsheet operations, or any other functions provided by the application 116. The use of applications during a network conference provides greater functionality during a network conference by allowing conference attendees to increase productivity and by providing an enhanced user experience.

A more detailed description of the CSAS to provide applications for use before, during, and after a network conference is provided below.

Figure 2:
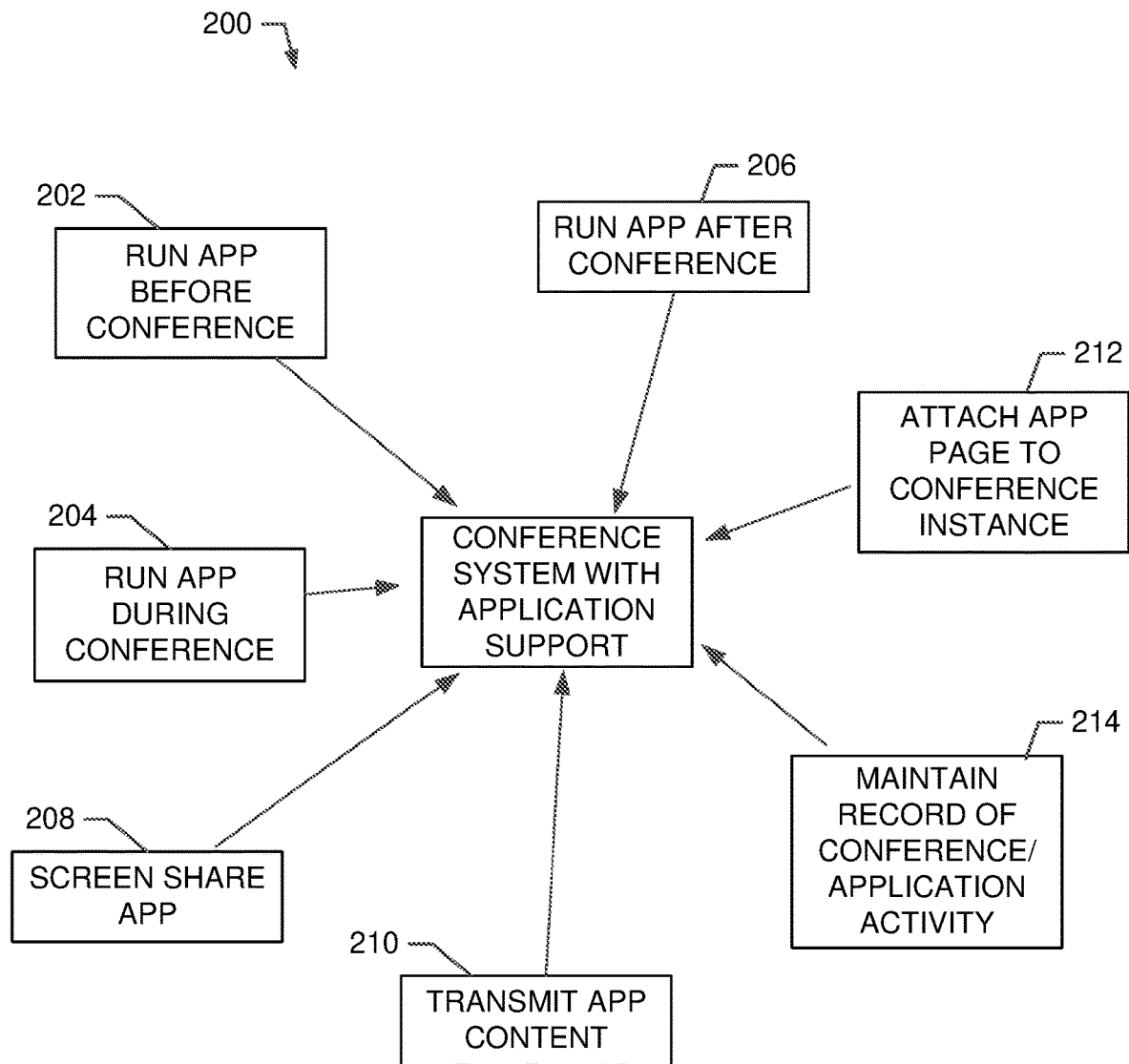
FIG. 2 shows exemplary functions provided by embodiments of a conference system with application support.

FIG. 2 shows exemplary functions 200 provided by embodiments of the conference system with application support. For example the functions 200 are available to attendees using the conference system with application support as shown in FIG. 1. In various exemplary embodiments, the conference system with application support provides one or more of the following application functions.

Run Applications before a Conference (202)—This function allows an application to be run from the conference system client before a network conference is started or joined. For example, a user may start a main module of the conference system client and then select from installed conference applications and run any of those installed conference application. The user may also download and install additional conference applications from the conference system server and then run any of those newly install applications from the conference system client. Thus, the user can interact with the running conference applications as desired before a network conference is started.

Run Applications During a Conference 204—This function allows an application to be run from the conference system client during a network conference. For example, a user may start or join a network conference and then select from installed conference applications and run any of those installed conference applications. The user may also download and install additional conference applications from the conference system server and then run any of those newly install applications during the network conference. Thus, the user can interact with the running conference applications as desired during a network conference.

Run Applications After a Conference 206—This function allows an application to be run from the conference system client after a network conference has completed. For example, a user may exit a network conference and then select from installed conference applications and run any of those installed conference application. The user may also download and install additional conference applications from the conference system server and then run any of those newly install applications during the network conference. Thus, the user can interact with the running conference applications as desired after a network conference has been exited.

Provide Screen Share of Application 208—This function allows a screen share of a conference application that is run from the conference system client. For example, a user may start or join a network conference and then select from installed conference applications and run any of those installed conference applications. When running, the application generates an application display window that appears on the user's screen. With a single button press or keystroke the user can screen share the application display window with other conference attendees. For example, the user may run a conference application that generate a display window showing time schedule of events and then share this display window of the time schedule with other conference attendees by pressing one button or key. Thus, the user can interact with the running conference applications as desired and screen share the results during a network conference.

Transmit Application Content During Conference 210—This function allows content from a conference application to be transmitted to attendees of network conference. For example, a user may start or join a network conference and then select from installed conference applications and run any of those installed conference applications. When running, the application generates an application display window that appears on the user's screen. The application display window shows application content (or content pages) that contain various content that has been entered by the user or has been generated by the application. The user can select any of the application content and transmit this content to attendees of the network conference. The application content is transmitted with an identifier that identifies the conference application associate with the content. When the transmitted content is received at an attendee device, the CSAS client uses the application identifier to select and run the application with the transmitted content on the attendee device. If the attendee device does not have the application installed, the application identifier is used to download and install the application on the attendee device to allow the content to be viewed. Thus, the user can interact with the running conference applications as desired and transmit application content to other attendees during a network conference.

Attach Application Page to Conference 212—This function allows a conference application page (or content) to be attached (or associated) with an instance of a network conference. For example, a user may identify a conference application page and form an attachment to an instance of a network conference. The attachment can occur before, during, or after the identified network conference occurs. For example, if the attachment of the page occurs before the conference is started, when a conference invitation is transmitted to the conference attendees, the attached application page is included with the invitation. This allows the attendees to open and view the page using the appropriate application before the conference begins.

Generate Record of Application Activity 214—This function allows a record of conference application activity to be maintained and saved. For example, a user may start or join a network conference and then select from installed conference applications and run any of those conference applications during the conference. After the conference has ended, a record of the applications that were run during the conference is saved on the user's device.

More detail descriptions of the functions provided by embodiments of the conference system with application support are provided in greater detail below.

Figure 3:
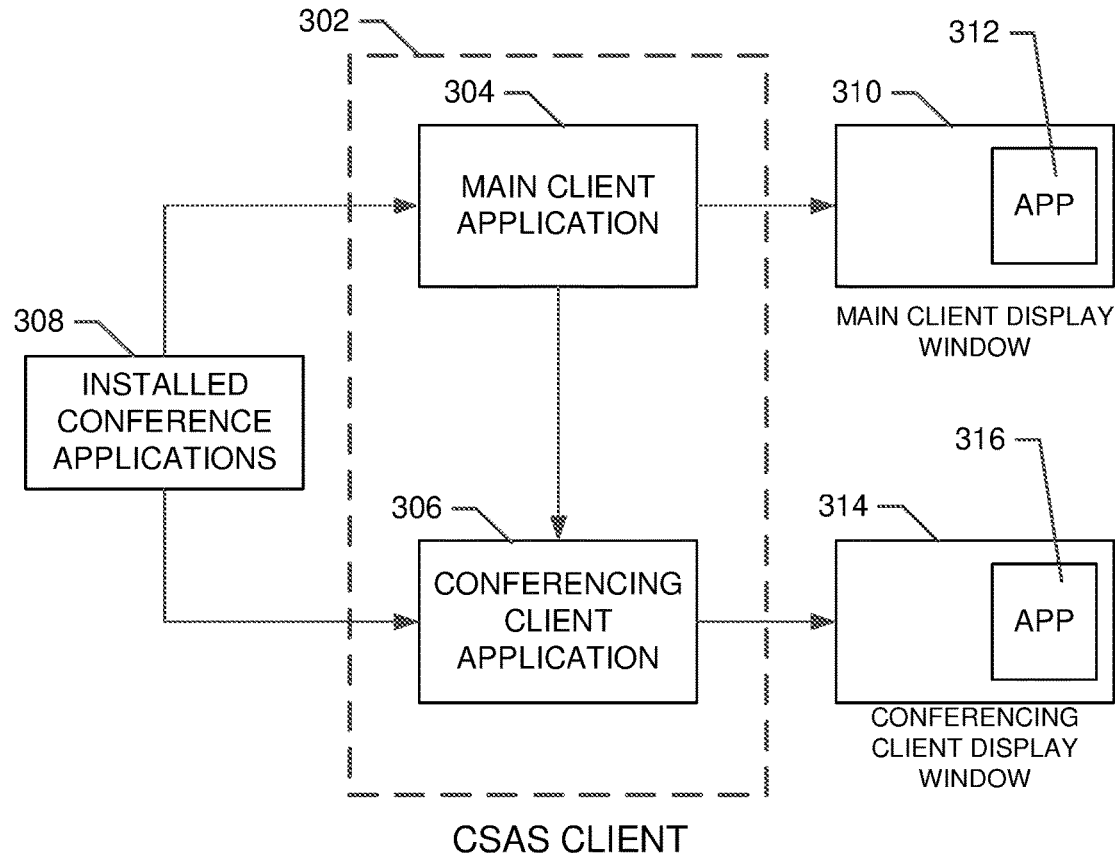
FIG. 3 shows an exemplary embodiment of a CSAS client configured to provide embodiments of the conference system with application support.
Figure 3:
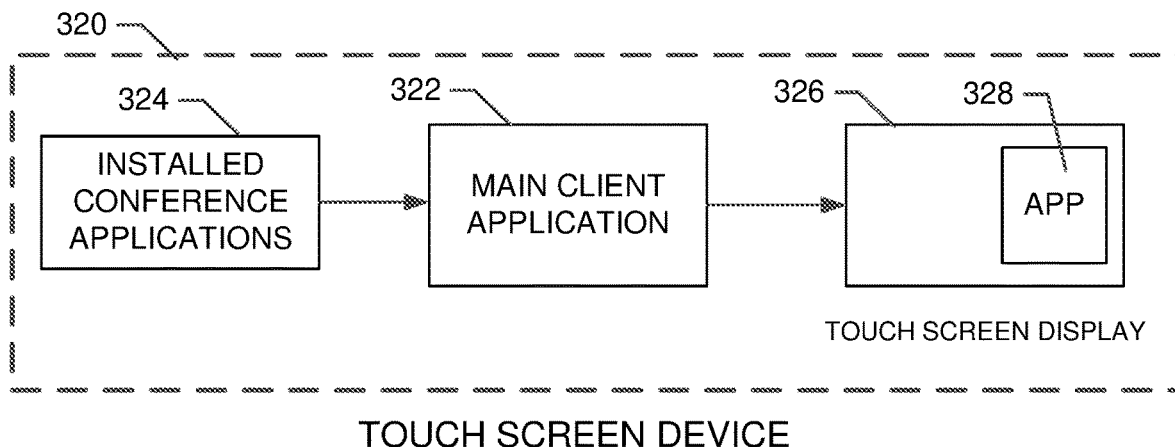

FIG. 3 shows an exemplary embodiment of a CSAS client 302 configured to provide embodiments of the conference system with application support. For example, the CSAS client 302 is suitable for use at the CSAS client 112. In an embodiment, the CSAS client 302 comprises a main client application 304 and a conferencing client application 306. When running, the main client application 304 provides a main client display window 310 in which a user interacts to setup, initiate, or join a network conference. In an embodiment, installed conference applications 308 can be accessed and run by the main client application 304 to generate a conference application interface window 312 that appears in the main client display window 310. The user can then interact with the conference application interface window 312 to perform a variety of functions provided by the application.

The main client application can also run a conferencing client application 306. When running, the conferencing client application 306 provides a conferencing client display window 314 in which a user interacts to participate in a network conference. In an embodiment, the installed conference applications 308 can be accessed and run by the conferencing client application 304 during a network conference to generate a conference application interface window 316 that appears in the conferencing client display window 314. The user can then interact with the conference application interface window 316 to perform a variety of functions provided by the application.

In an embodiment, the main client application 304 and the conferencing client application 306 comprise an embodiment of a Web browser and the conference applications 308 comprise an embodiment of Web applications that are configured to run in the Web browser. However, other configurations for running the conference applications 308 in the main 304 and conferencing 306 client applications can be utilized.

In still another embodiment, a standalone device, such as the touch screen device 320 is provided that includes a main client application 322 and installed conference applications 324. The main client application 322 can run any of the installed conference applications 324 on a touch screen display 326 to generate a conference application interface window 328 that can provide user interaction through the touch screen 326.

Figure 4:
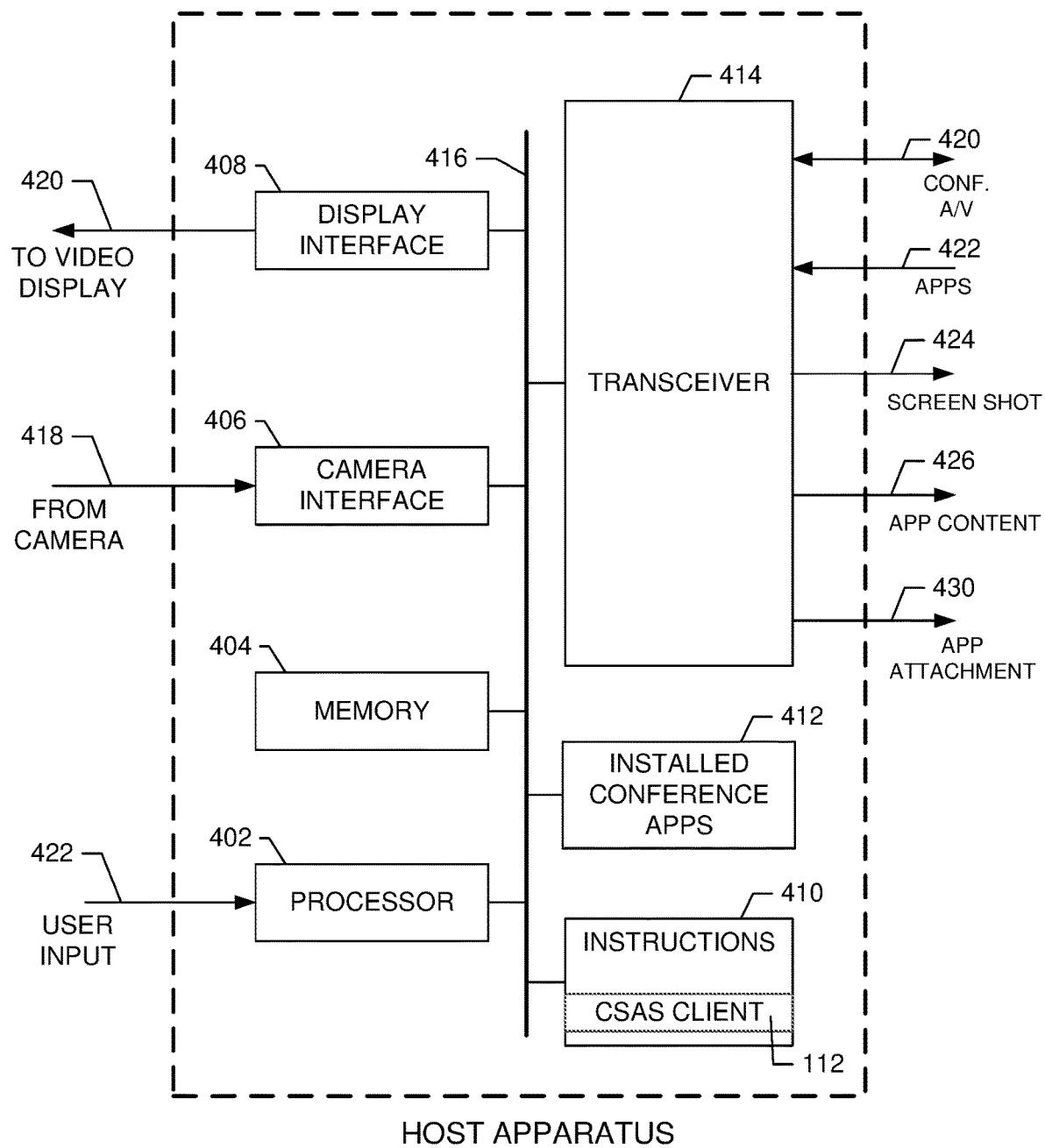
FIG. 4 shows an exemplary host apparatus configured to provide embodiments of the conference system with application support.

FIG. 4 shows an exemplary host apparatus 400 configured to provide embodiments of the conference system with application support. For example, the host apparatus 400 is suitable for use as the host UE 102 shown in FIG. 1. The host apparatus 400 comprises processor 402, memory 404, camera interface 406, display interface 408, instructions 410, installed conference applications 412, and transceiver 414 all connected to communicate over data bus 416. In an embodiment, the instructions 410 comprise the conference system with application support client 112.

During operation, the processor 402 executes the instructions 410 to enable the client 112 to perform the functions and operations of the CSAS. For example, the processor 402 controls the camera interface 406 to receive a video signal 418 from a camera mounted at the user equipment. The video signal contains an image of the host user. The display interface 408 is configured to output display information 420 to a video display that is part of the host apparatus.

The processor 402 also receives user input 422 and uses this input to perform various functions of the CSAS. The transceiver 414 is used by the processor 402 to transmit and receive information during a network conference. For example, the processor 402 uses the transceiver 414 to transmit and receive conference audio and video information 420. The transceiver 414 also receives conference applications 422 that are installed as installed applications 412 as part of the CSAS. The transceiver 414 also transmits conference applications screen shots 424, conference application content 426, and conference application content attached to an instance of a conference 428. In various exemplary embodiments, the processor 402 executes the CSAS client 112 to perform the conferencing functions and operations as shown in FIG. 2.

Figure 5:
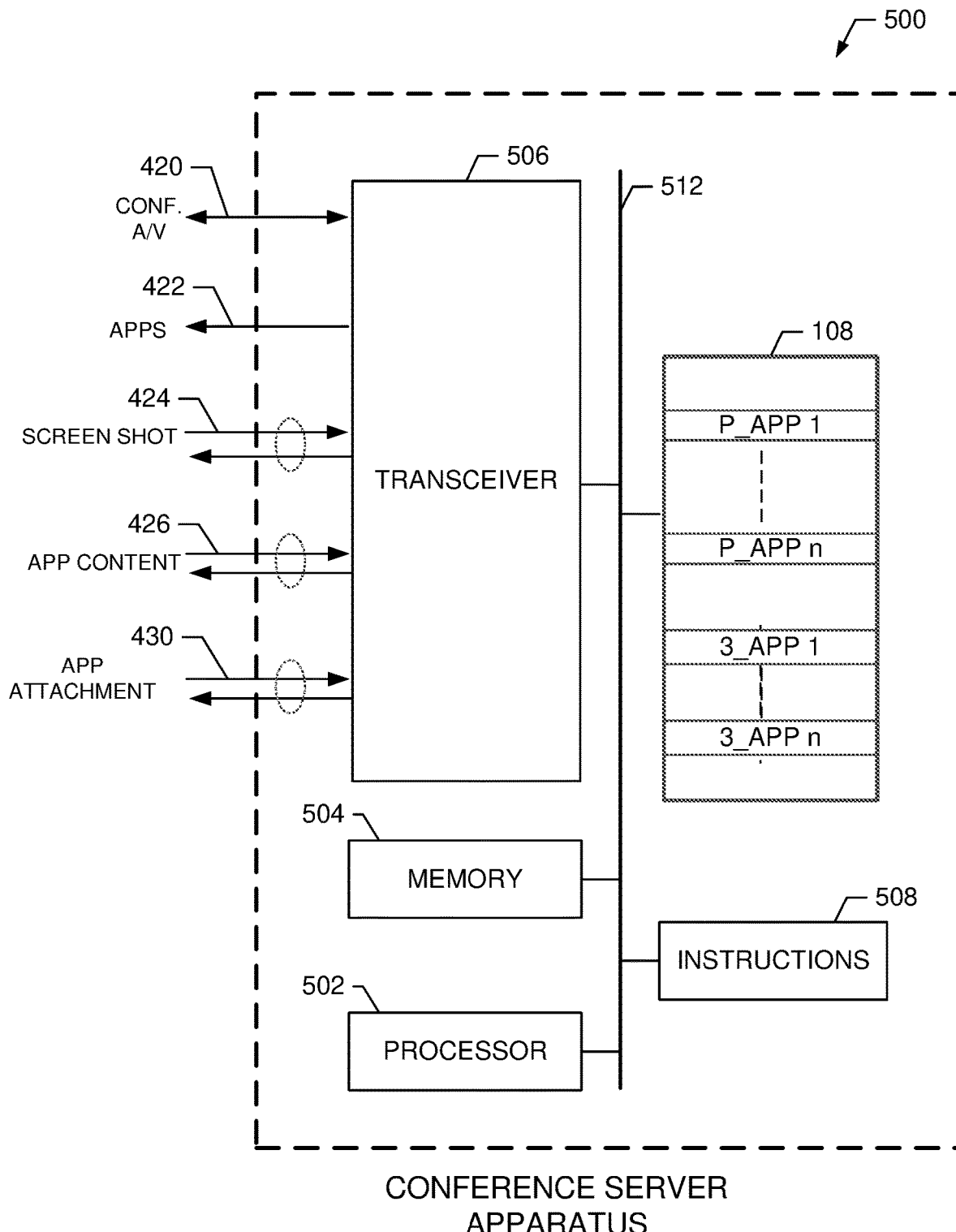
FIG. 5 shows an exemplary conference server configured to provide embodiments of the conference system with application support.

FIG. 5 shows an exemplary conference server apparatus 500 configured to provide embodiments of the conference system with application support. For example, the server apparatus 500 is suitable for use as the server 104 shown in FIG. 1. In an embodiment, the server 500 comprises processor 502, memory 504, transceiver 506, instructions 508, and conference application storage 108 all couple to communicate over bus 512. The conference application storage 108 comprises a plurality of propriety and third-party conference applications can be downloaded and install in user equipment and use during network conferences. During operation, the processor 502 executes instructions 508 and utilizes the memory 504 as necessary to perform the functions of the server 500 as described herein.

During a network conference, the transceiver 506 communicates with the network 106 to exchange information between the conference host and attendees. For example, audio/video information 420 is exchanged between the conference participants. The transceiver 506 transmits conference applications 422 for installation on the systems of the conference attendees. When screen shot 424, application content 426, and application attachments 430 are received from the host UE, the transceiver 506 re-transmits that information to the designated conference attendees.

Therefore, in various exemplary embodiments, the server apparatus 500 is configured to store conference applications 108 and provide those applications to participants of a network conference in accordance with CSAS. The server 500 also facilitates the operation of network conference to provide all the features and functionality of CSAS.

Figure 6:
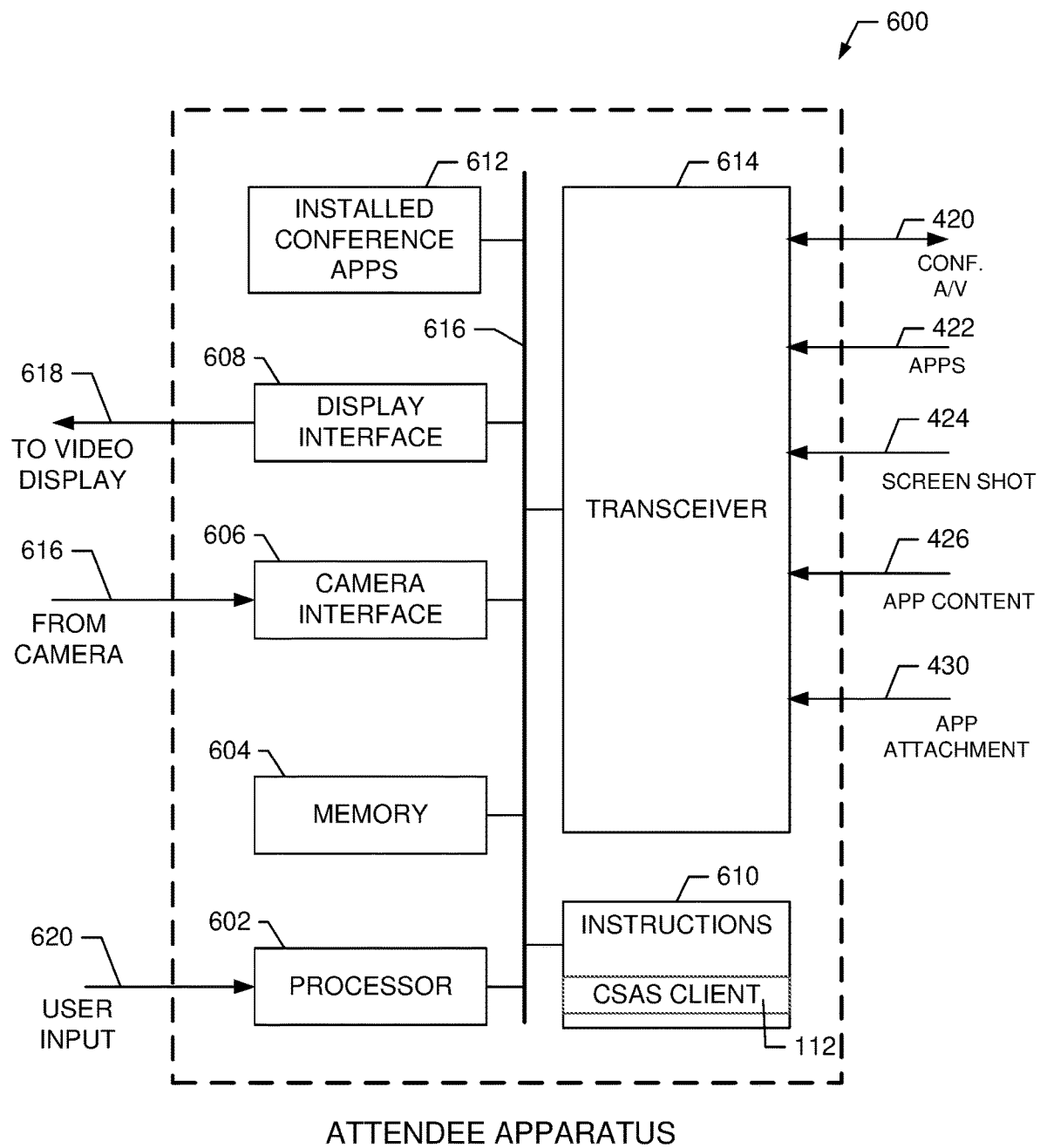
FIG. 6 shows an exemplary attendee apparatus configured to provide embodiments of the conference system with application support.

FIG. 6 shows an exemplary attendee apparatus 600 configured to provide embodiments of the conference system with application support. For example, the attendee apparatus 600 is suitable for use as any of the attendee apparatus A1-A3 shown in FIG. 1. The attendee apparatus 600 comprises processor 602, memory 606, camera interface 606, display interface 608, instructions 610, installed conference applications 612, and transceiver 614 all connected to communicate over data bus 616. In an embodiment, the instructions 610 comprise the conference system with application support client 112.

During operation, the processor 602 executes the instructions 610 to enable the client 112 to perform the functions and operations of the CSAS. For example, the processor 602 controls the camera interface 606 to receive a video signal 618 from a camera mounted at the user equipment. The video signal contains an image of the attendee user. The display interface 608 is configured to output display information 620 to a video display that is part of the attendee apparatus.

The processor 602 also receives user input 622 and uses this input to perform various functions of the CSAS. The transceiver 616 is used by the processor 602 to transmit and receive information during a network conference. For example, the processor 602 uses the transceiver 616 to transmit and receive conference audio and video information 420. The transceiver 616 also receives conference applications 422 that are installed as installed conference application 612 as part of the CSAS. The transceiver 616 also receives conference applications screen shots 424, conference application content 426, and conference application content attached to an instance of a conference 430. In various exemplary embodiments, the processor 602 executes the CSAS client 112 to perform the conferencing functions and operations as shown in FIG. 2.

Figure 7:
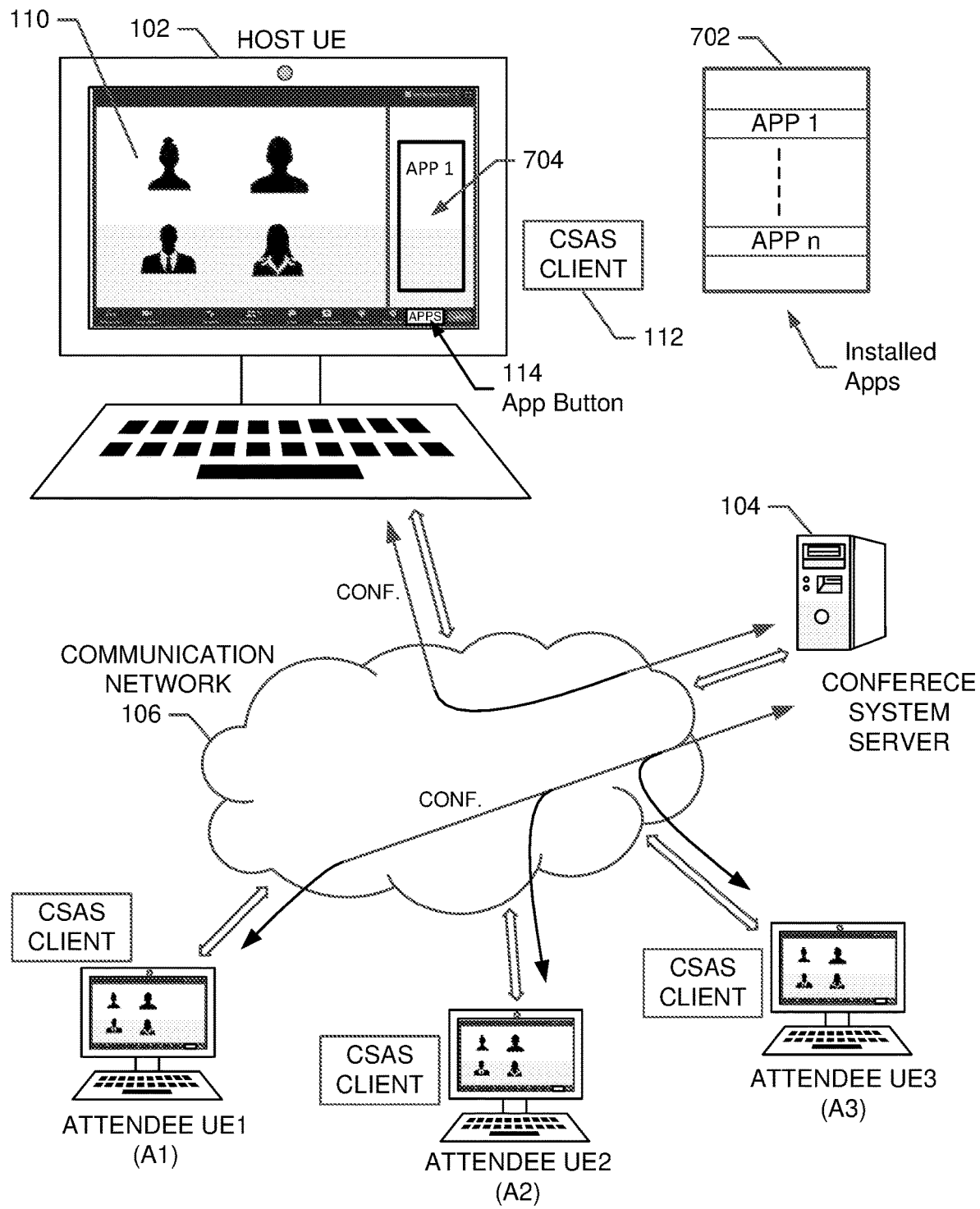
FIG. 7 shows a diagram illustrating an exemplary embodiment of a conference system with application support in which an application is run during a network conference.

FIG. 7 shows a diagram illustrating an exemplary embodiment of a conference system with application support in which a client application 112 is run on a host equipment 102 during a network conference. The client application 112 is also running on attendee computers A1-A3. The network server 104 facilitates the network conference over the communication network 106. For example, the client application 112 provides a network conference display 110 on the host system and the attendee systems during the network conference.

During the conference, the user of the host system 102 selects the conference application selector (button) 114 to view a listing 702 of installed conference applications. The user selects one or more of the conference applications to run during the conference. For example, the user select conference application 1 704 to run during the conference. The application 1 704 runs in a side panel on the right side of the conference display 110. During the conference the user can interact with the application 704 to take notes or make other entries depending on the functionality of the application. In an embodiment, the following functions are performed by embodiments of the CSAS.

1. Application selector button provided on menu to display directory of installed conference applications. Ability to install additional conference applications from application store on network server.

2. Selection of one or more conference applications to run during a network conference.

3. Run conference applications in sidebar during network conference.

4. Allow multiple conference applications to be installed and run at the same time (multitasking).

5. Allow resizing and repositioning of conference application dialog windows.

Figure 8:
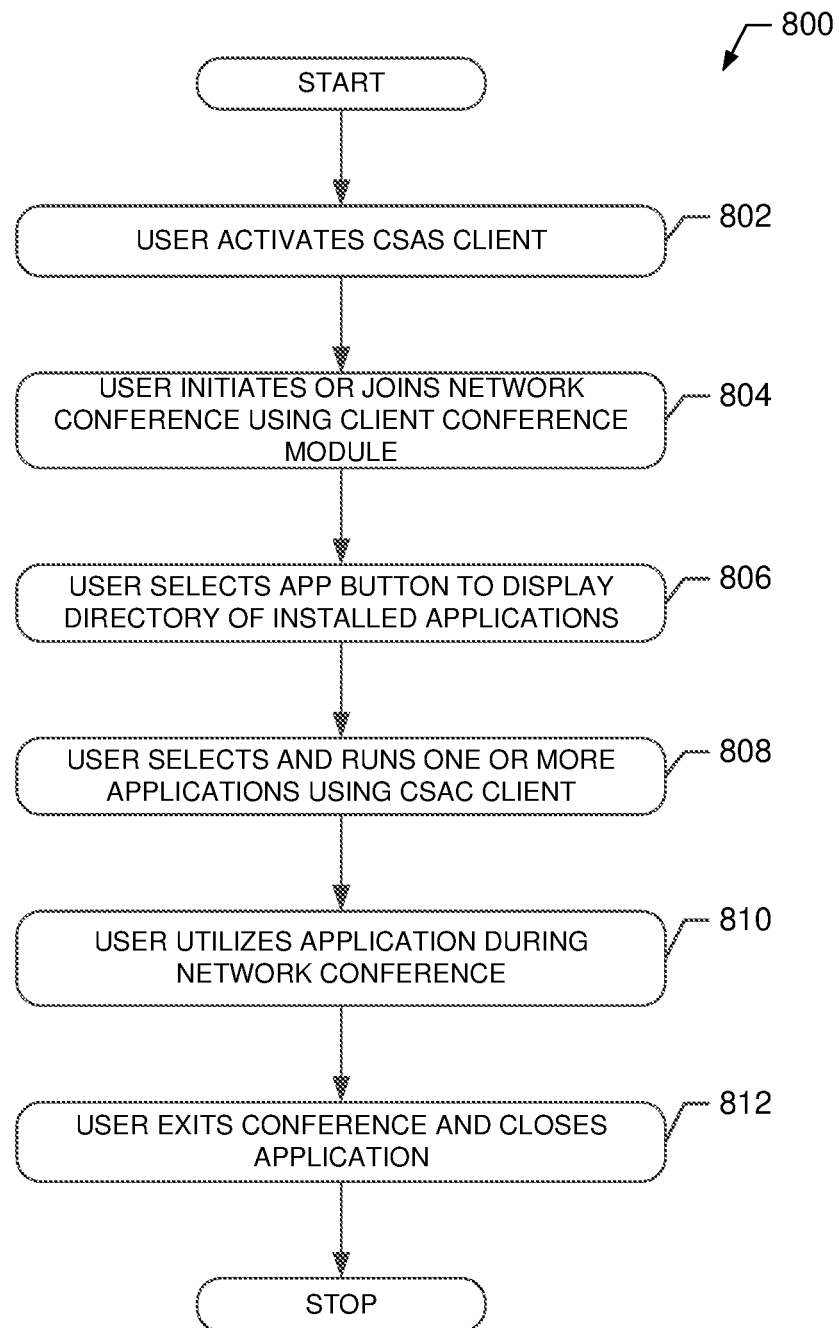
FIG. 8 shows an exemplary method for running an application during a network conference.

FIG. 8 shows an exemplary method for running a conference application during a network conference. For example, in an embodiment, the method 800 is performed by the client application 112 running on the host 102 any of the attendee UE (A1-A3) systems shown in FIG. 7.

At block 802, a user activates the CSAS client on the device or system. For example, the user of the host 102 activates the CSAS client 112.

At block 804, the user initiates or joins a network conference using the CSAS client. For example, the user of the host 102 joins a conference with the attendees (A1-A3) utilizing the network server 104 and the network 106.

At block 806, the user selects the application button to display a directory listing of installed applications. For example, the user of the host 102 selects the application button 114 to see the listing 702 of conference applications installed on the host 102.

At block 808, the user selects and runs one or more of the application shown in the directory listing. For example, the user of the host 102 selects and runs the application 704 using the CSAS client, which provides an application dialog window in a right sidebar of the display 110.

At block 810, the user of the host 102 utilizes the application during the network conference with the attendees (A1-A3). For example, the conference application 704 provides any desired functionality, such as word processing, spreadsheets, presentations, or any other type of functionality suitable for an application.

At block 812, the user exits the client conference and closes the application.

Thus, the method 800 provides a method running a conference application during a network conference. It should be noted that the operations of the method 800 are exemplary and not limiting of the scope of the embodiments. Furthermore the operations of the method 800 can be changed, deleted, rearranged, added to, or otherwise modified within the scope of the embodiments.

Figure 9:
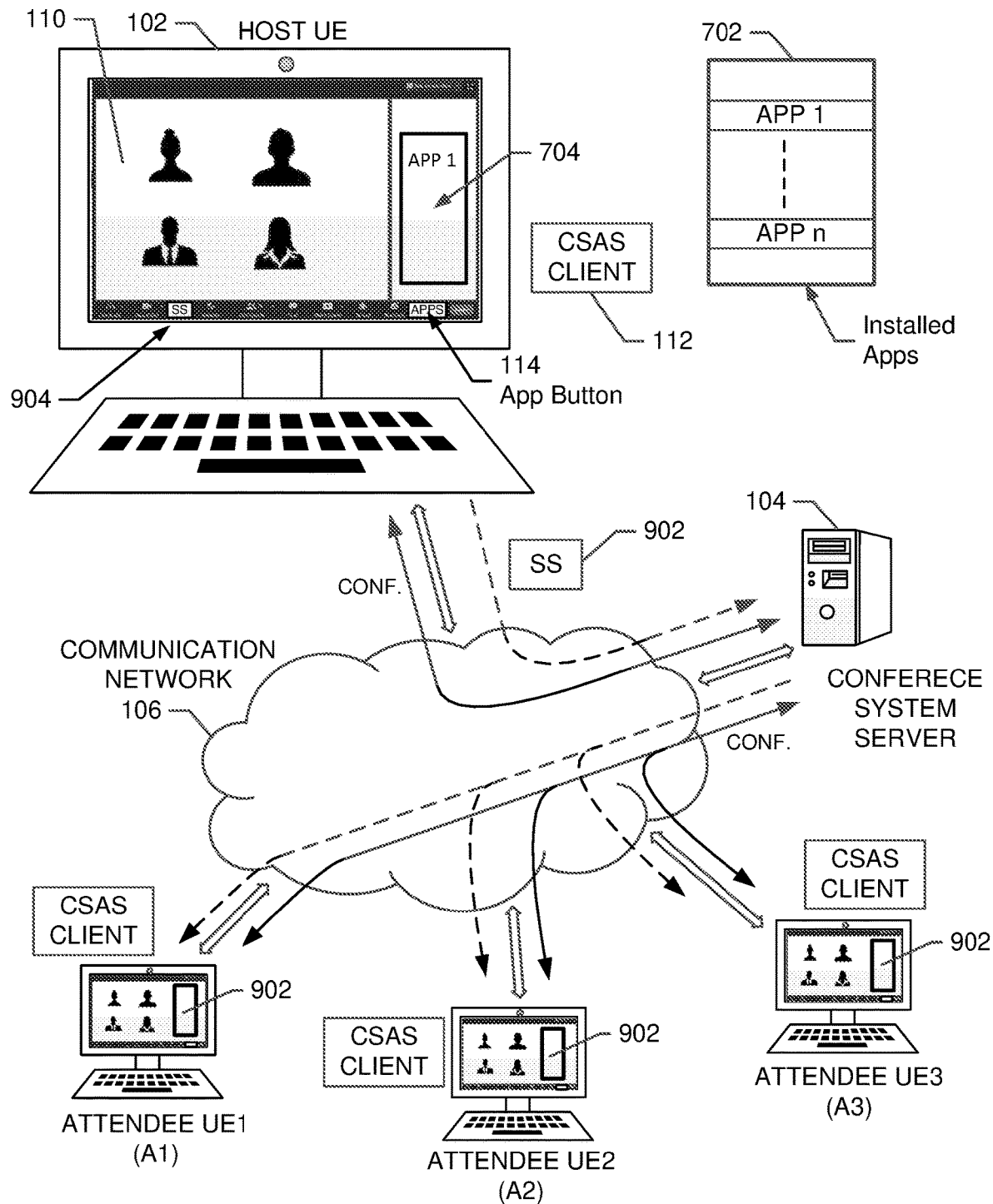
FIG. 9 a diagram illustrating an exemplary embodiment of a conference system with application support in which an application screen shot is shared during a network conference.

FIG. 9 a diagram illustrating an exemplary embodiment of a conference system with application support in which an application screen shot is shared during a network conference. In an exemplary embodiment, the client application 112 is run on a host equipment 102 during a network conference. The client application 112 is also running on attendee computers A1-A3. The network server 104 facilitates the network conference over the communication network 106. For example, the client application 112 provides a network conference display 110 on the host system and the attendee systems during the network conference.

During the conference, the user of the host system 102 selects the conference application selector 114 to view a listing 702 of installed conference applications. The user selects one or more of the conference applications to run during the conference. For example, the user select conference application 1 704 to run during the conference. The application 1 704 runs in a sidebar on the right side of the conference display 110. During the conference the user can interact with the application 704 to take notes or make other entries depending on the functionality of the application. In an embodiment, the user selects a button 904 to generate a screen shot (SS) 902 of a display window generated by the application 704. The SS 902 is transmitted to the attendees (A1-A3) through the server 104 and the network 106. The SS 902 then appears on the displays of the attendee's systems. Thus, the user of the host 102 can transmit screen shots of conference applications in use on the host to any or all of the attendee's systems. In an embodiment, the following functions are performed by embodiments of the CSAS.

1. Application selector button provided on menu to display directory of installed conference applications. Ability to install additional conference applications from application store on network server.

2. Selection of one or more conference applications to run during a network conference.

3. Run conference applications in sidebar during network conference.

4. Allow multiple conference applications to be installed and run at the same time (multitasking).

5. Allow resizing and repositioning of conference application dialog windows.

6. Activate selector 904 to transmit screen shot of a conference application window to one or more conference attendees.

Figure 10:
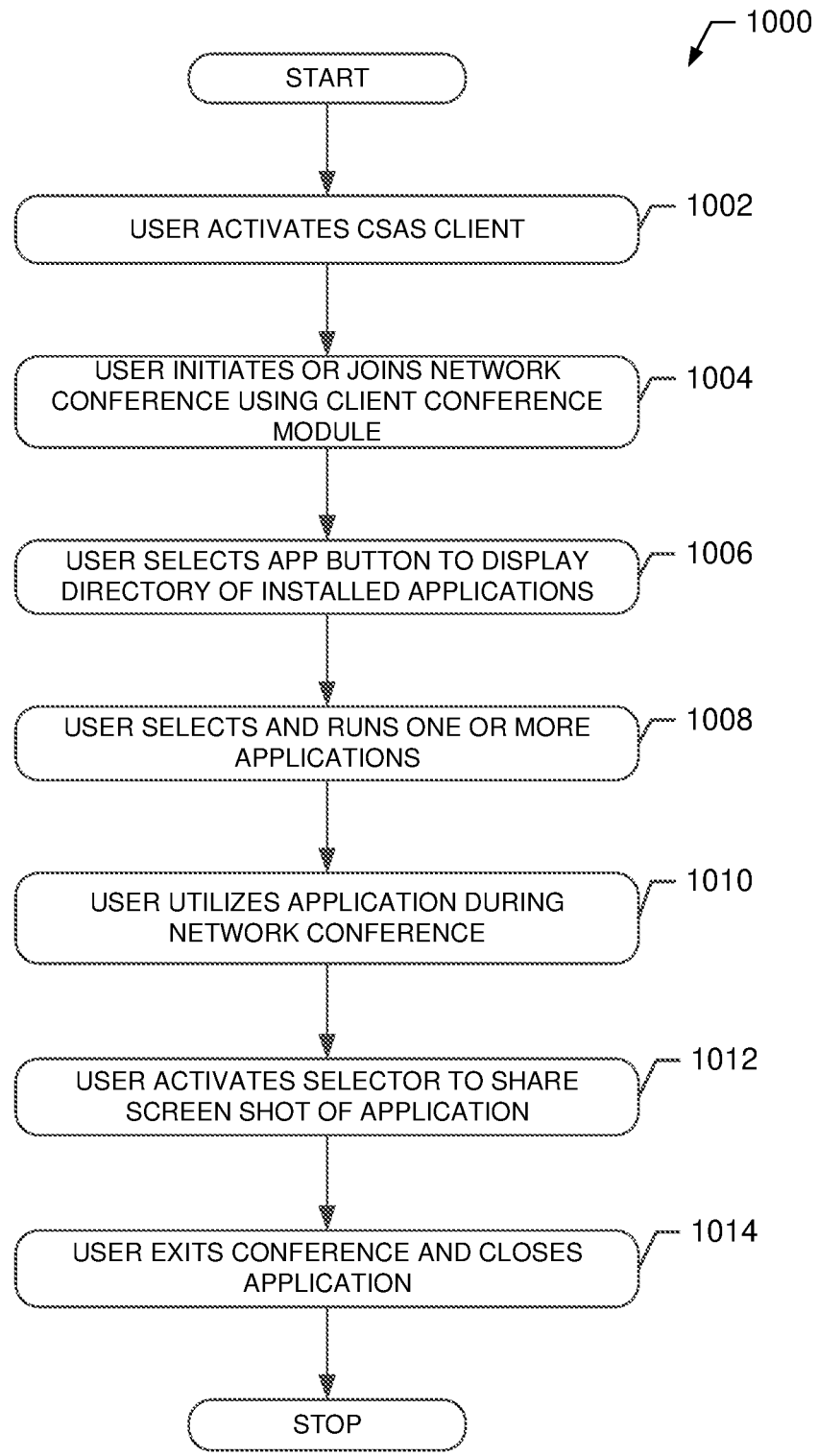
FIG. 10 shows an exemplary method for sharing an application screen during a network conference.

FIG. 10 shows an exemplary method for sharing a screen shot of a conference application during a network conference. For example, in an embodiment, the method 1000 is performed by the client application 112 running on the host 102 any of the attendee UE (A1-A3) systems shown in FIG. 9.

At block 1002, a user activates the CSAS client on the device or system. For example, the user of the host 102 activates the CSAS client 112.

At block 1004, the user initiates or joins a network conference using the CSAS client. For example, the user of the host 102 joins a conference with the attendees (A1-A3) utilizing the network server 104 and the network 106.

At block 1006, the user selects the application button to display a directory listing of installed applications. For example, the user of the host 102 selects the application button 114 to see the listing 702 of conference applications installed on the host 102.

At block 1008, the user selects and runs one or more of the application shown in the directory listing. For example, the user of the host 102 selects and runs the application 704, which provides an application dialog window in a right sidebar of the display 110.

At block 1010, the user of the host 102 utilizes the application during the network conference with the attendees (A1-A3). For example, the conference application 704 provides any desired functionality, such as word processing, spreadsheets, presentations, or any other type of functionality suitable for an application.

At block 1012, the user of the host 102 activate the selector 904 to capture and transmit a screen shot of a conference application window to one or more conference attendees. For example, the client 112 captures the screen shot 902 of the application 704 and transmits the screen shot 902 to one or more of the attendee systems.

At block 1014, the user exits the conference and closes the application.

Thus, the method 1000 provides a method for sharing a screen shot of a conference application during a network conference. It should be noted that the operations of the method 1000 are exemplary and not limiting of the scope of the embodiments. Furthermore the operations of the method 1000 can be changed, deleted, rearranged, added to, or otherwise modified within the scope of the embodiments.

Figure 11:
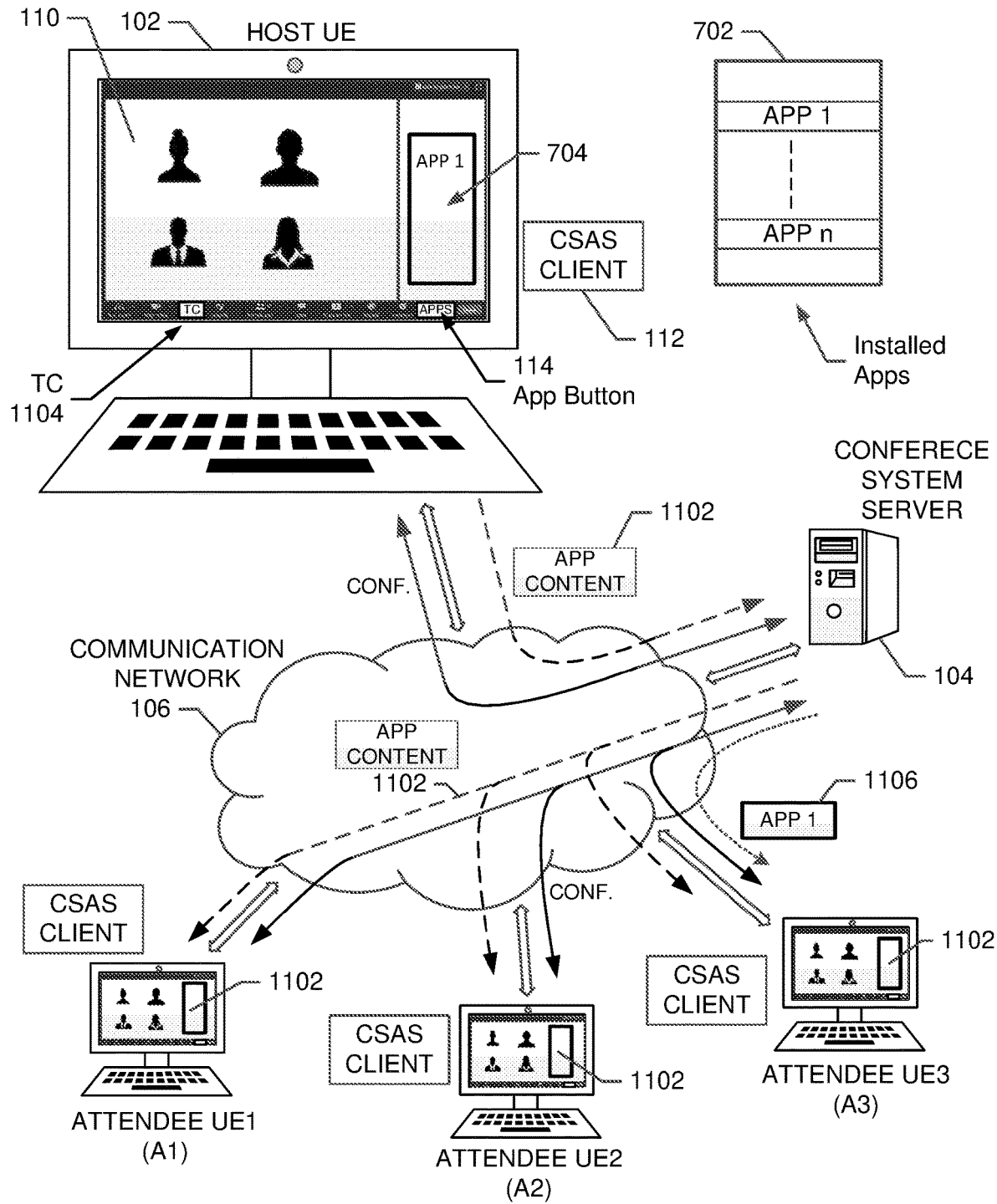
FIG. 11 shows a diagram illustrating an exemplary embodiment of a conference system with application support in which application content is transmitted during a conference to another attendee.

FIG. 11 shows an exemplary method for transmitting application content during a network conference. In an exemplary embodiment, the client application 112 is run on a host equipment 102 during a network conference. The client application 112 is also running on attendee computers A1-A3. The network server 104 facilitates the network conference over the communication network 106. For example, the client application 112 provides a network conference display 110 on the host system and the attendee systems during the network conference.

During the conference, the user of the host system 102 selects the conference application selector 114 to view a listing 702 of installed conference applications. The user selects one or more of the conference applications to run during the conference. For example, the user select conference application 1 704 to run during the conference. The application 1 704 runs in a side panel on the right sidebar of the conference display 110. During the conference the user can interact with the application 704 to take notes or make other entries depending on the functionality of the application. In an embodiment, the user desired to transmit application content to one or more of the attendees. The user of the host 102 selects a "transmit content" (TC) button 1104 to transmit application content 1102 to the attendees for use on the attendee systems. The application content includes an application identifier that identifies the application with which the content is to be viewed. When the content is received at an attendee device, the CSAS client determines if the application corresponding to the application identifier is installed at the attendee. If the application is installed, the CSAS client runs that application and displays the content. If an attendee does not have the correct application installed, the CSAS client will automatically install the application from the server. For example, the attendee A3 does not have the application 704 installed. The CSAS client at the attendee A3 automatically installs the application 1 (as indicated at 1106) from the server 104 and then displays the application content 1102 on the attendee A3 device. In an embodiment, the following functions are performed by embodiments of the CSAS.

1. Application selector button provided on menu to display directory of installed conference applications. Ability to install additional conference applications from application store on network server.

2. Selection of one or more conference applications to run during a network conference.

3. Run conference applications in sidebar during network conference.

4. Allow multiple conference applications to be installed and run at the same time (multitasking).

5. Allow resizing and repositioning of conference application dialog windows.

6. Activate selector TC selector 1104 to transmit application content from a conference application running on the host to one or more conference attendees. The transmitted application content includes an application identifier.

7. An attendee device receives that application content and the identifier. The CSAS client running on the attendee device runs the application corresponding to the application identifier and displays the content.

8. If the application corresponding to the application identifier is not installed on the attendee device, the CSAS client automatically downloads and installs the application 1106 from the server 104. The CSAS client running on the attendee device runs the newly installed application corresponding to the application identifier and displays the content.

Figure 12:
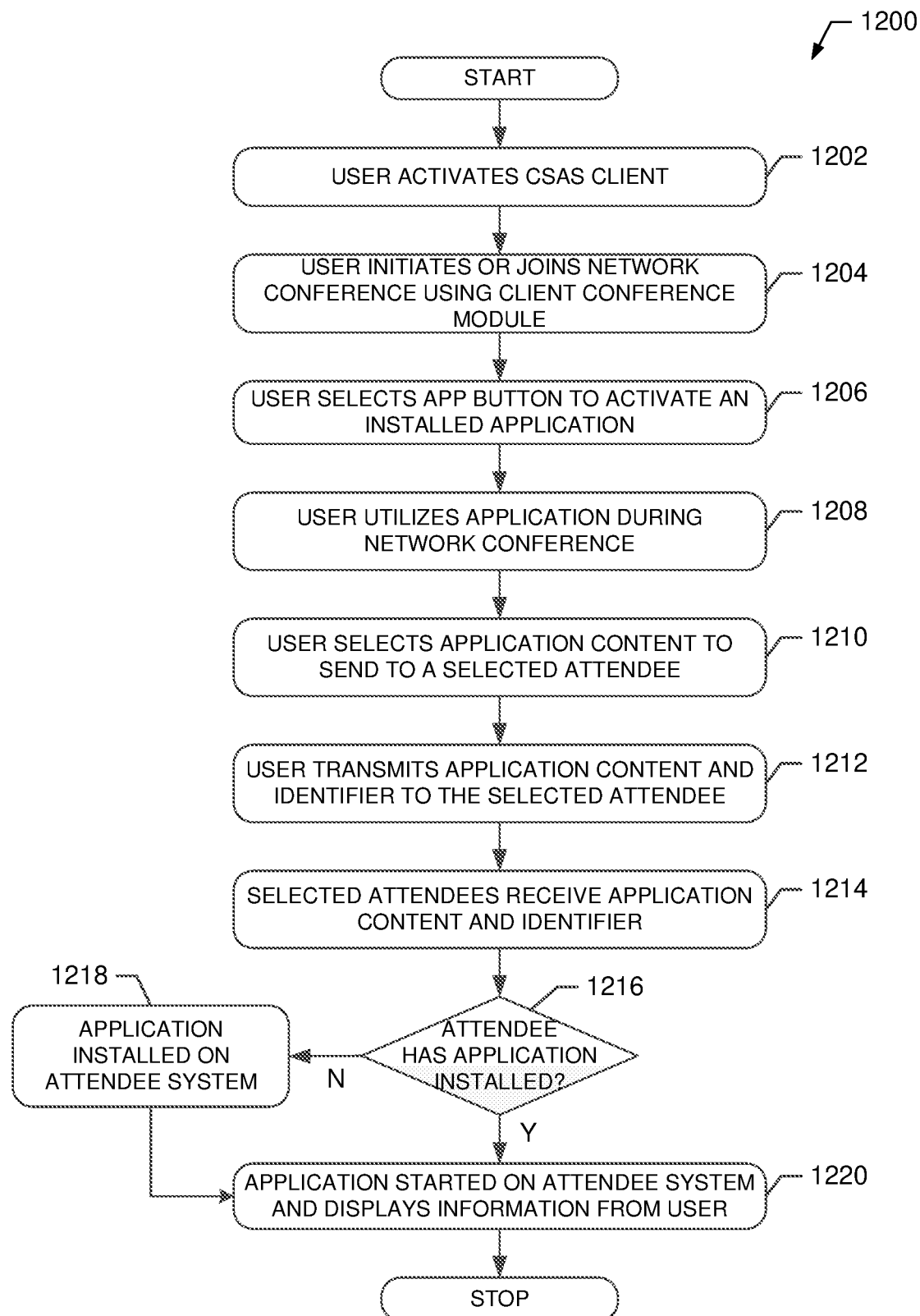
FIG. 12 shows an exemplary method for transmitting application content during a network conference.

FIG. 12 shows an exemplary method for transmitting application content during a network conference. For example, in an embodiment, the method 1200 is performed by the client application 112 running on the host 102 or any of the attendee UE (A1-A3) systems shown in FIG. 11.

At block 1202, a user activates the CSAS client on the device or system. For example, the user of the host 102 activates the CSAS client 112.

At block 1204, the user initiates or joins a network conference using the CSAS client. For example, the user of the host 102 joins a conference with the attendees (A1-A3) utilizing the network server 124 and the network 126.

At block 1206, the user selects the application button to display a directory listing of installed applications. For example, the user of the host 102 selects the application button 114 to see the listing 702 of conference applications installed on the host 122.

At block 1208, the user selects and runs one or more of the application shown in the directory listing. For example, the user of the host 102 selects and runs the application 704, which provides an application dialog window in a right sidebar of the display 112.

At block 1210, the user of the host 102 utilizes the application during the network conference with the attendees (A1-A3). The user identifies application to be transmitted to other attendees of the network conference. For example, the conference application 702 provides any desired functionality, such as word processing, spreadsheets, presentations, or any other type of functionality suitable for an application.

At block 1212, the user transmits the application content and an application identifier to other attendees of the network conference. For example, the user of the host 102 selects the TC button 1104 to transmit the content and identifier 1106 to other network attendees.

At block 1214, an attendee of the conference receives the transmitted content and the application identifier.

At block 1216, a determination is made as to whether the receiving attendee has the correct application installed. For example, the CSAS client running at the attendee determines if the application identifier that was received matches any of the currently installed applications. If the application is installed, the method proceed to block 1220. If the applicant is not installed the method proceeds to block 1218.

At block 1218, the application is installed on the attendee system. For example, the CSAS client automatically installs the application from the server 104. For example, the CSAS client utilizes the received application identifier to install the correct application.

At block 1220, the identified application is started on the attendee system and the received application content is displayed on the attendee system.

Thus, the method 1200 provides a method for transmitting application content during a network conference. It should be noted that the operations of the method 1200 are exemplary and not limiting of the scope of the embodiments. Furthermore the operations of the method 1200 can be changed, deleted, rearranged, added to, or otherwise modified within the scope of the embodiments.

Figure 13:
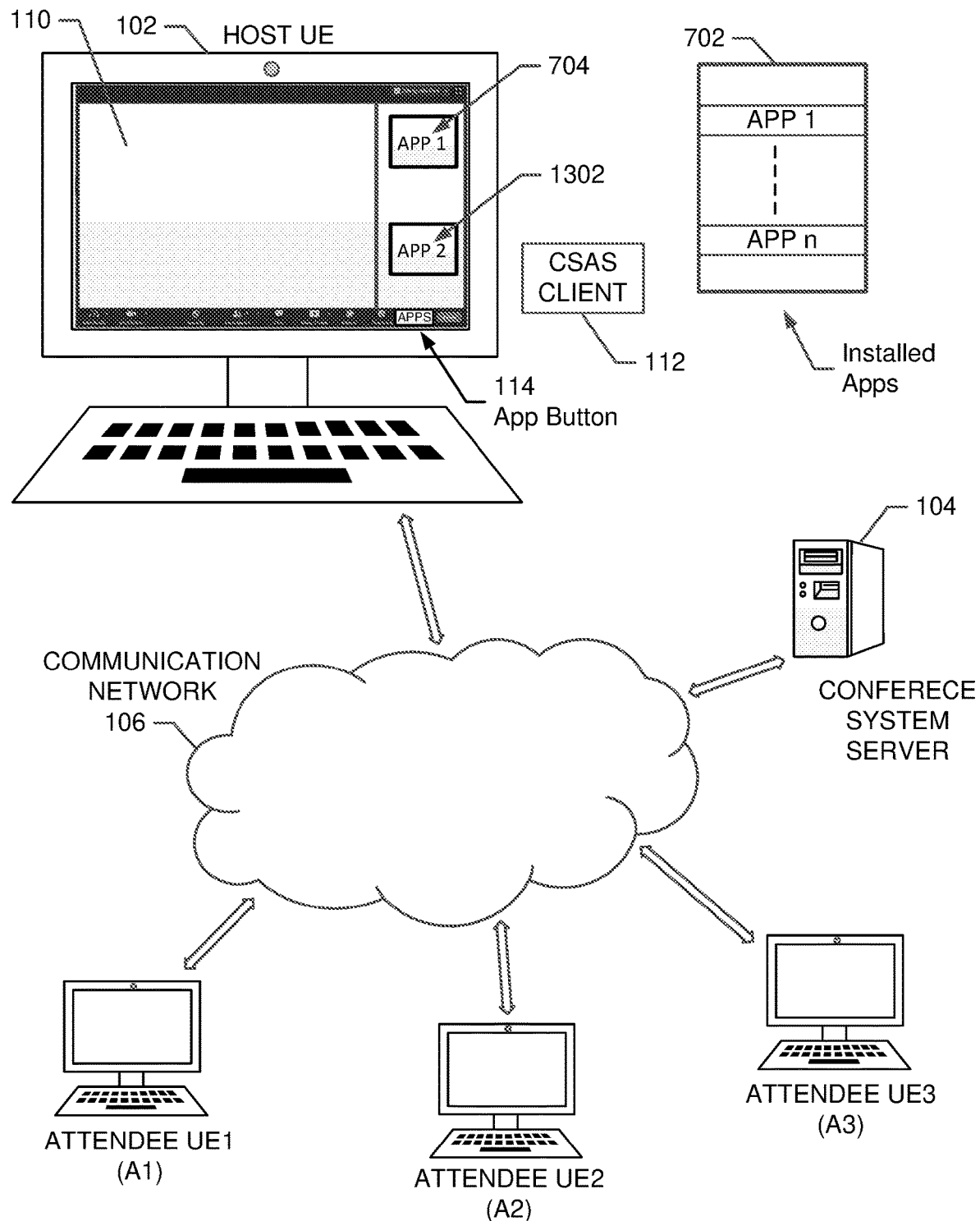
FIG. 13 a diagram illustrating an exemplary embodiment of a conference system with application support in which applications are run before and after a network conference.

FIG. 13 a diagram illustrating an exemplary embodiment of a conference system with application support in which applications are run before or after a network conference.

In an exemplary embodiment, the CSAS client application 112 is run on host equipment 102. Prior to joining or initiating a network conference, the user of the host 102 selects the application button 114 to see the list installed applications 702. The user of the host 102 selects the application 704 to run. The user interacts with the application 704 and can either close the application or leave the application running when joining a network conference.

The user of the host 102 can participate in a network conference and continue to utilize the application 704. After the conference is completed, the user of the host 102 can select and run another application 1302. After interacting with the applications 704 and 1302, the user can close the applications. In an embodiment, the following functions are performed by embodiments of the CSAS client to utilize conference applications before or after a network conference.

1. A user activates the CSAS client but does not join a network conference.

2. The user selects a conference application to run. For example, the user selects one of the previously installed conference applications 702.

3. The user interacts with the conference application as desired to perform some function of the application.

4. The user joins a network conference as described above.

5. During the conference the user continues to use the conference application.

6. The user leaves the network conference. The user may or may not close the conference application.

7. The user selects another conference application to run. For example, the user selects another one of the previously installed conference applications 702.

Figure 14:
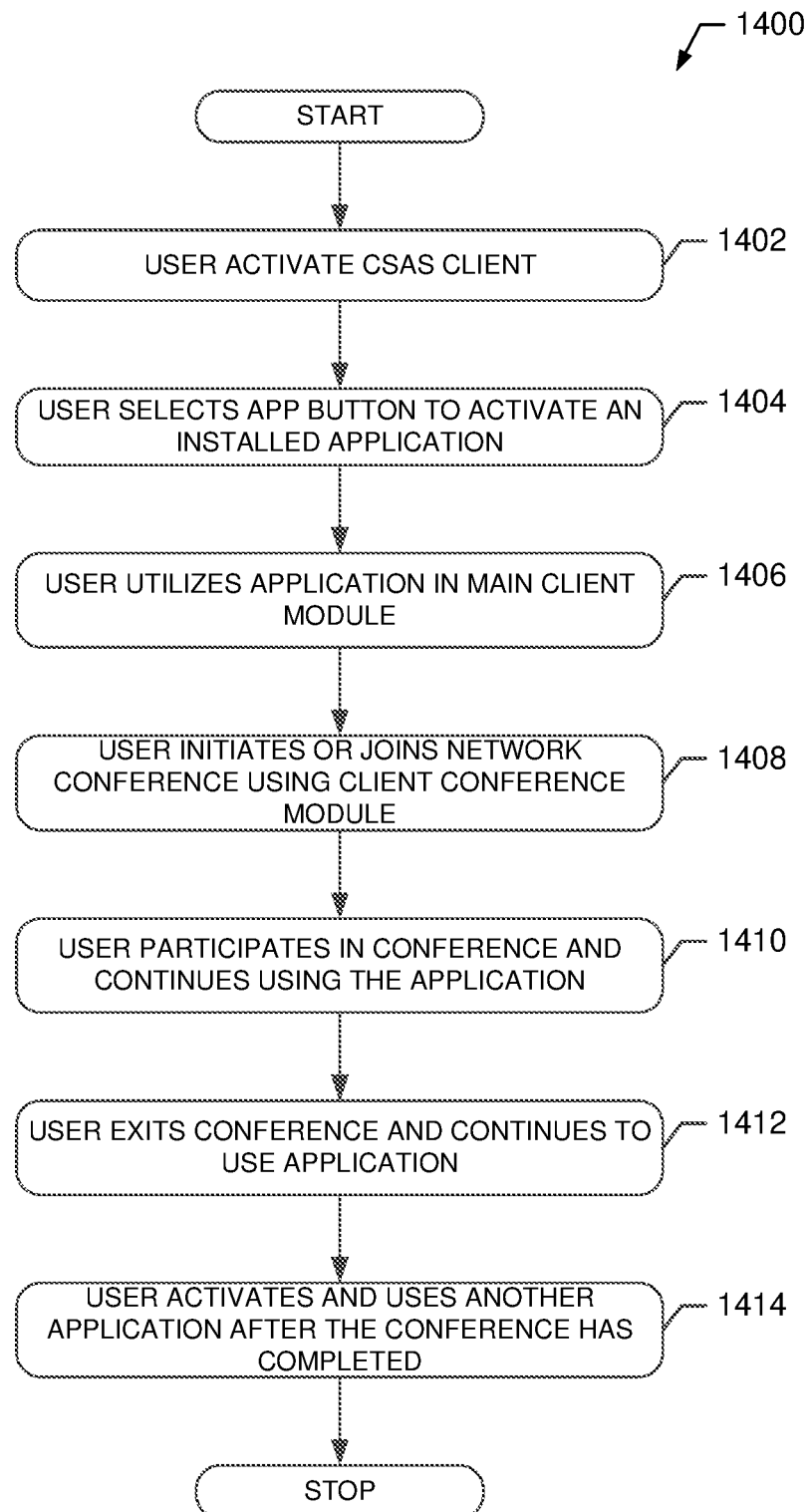
FIG. 14 shows an exemplary method for running applications before and after a network conference.

FIG. 14 shows an exemplary method 1400 for running conference applications before or after a network conference. For example, in an embodiment, the method 1400 is performed by the client application 112 running on the host 102 or any of the attendee UE (A1-A3) systems shown in FIG. 13.

At block 1402, a user activates the CSAS client on the device or system. For example, the user of the host 102 activates the CSAS client 112.

At block 1404, the user selects the application button to display a directory listing of installed applications. For example, the user of the host 102 selects the application button 114 to see the listing 702 of conference applications installed on the host 142.

At block 1406, the user utilizes the application before joining a network conference.

At block 1408, the user initiates or joins a network conference. For example, the user of the host 102 uses the CSAS client to initiates a network conference with the attendees A1-A3.

At block 1410, the user participates in the network conference and continues to use the application 704.

At block 1412, the user exits the network conference and may or may not continue to use the application 704. For example, the user may wish to close the application 704.

At block 1414, the user activates and user another conference application after the network conference has ended. For example, the user selects and runs the application 1302 after the network conference has ended.

Thus, the method 1400 provides a method for running conference applications before or after a network conference. It should be noted that the operations of the method 1400 are exemplary and not limiting of the scope of the embodiments. Furthermore the operations of the method 1400 can be changed, deleted, rearranged, added to, or otherwise modified within the scope of the embodiments.

Figure 15:
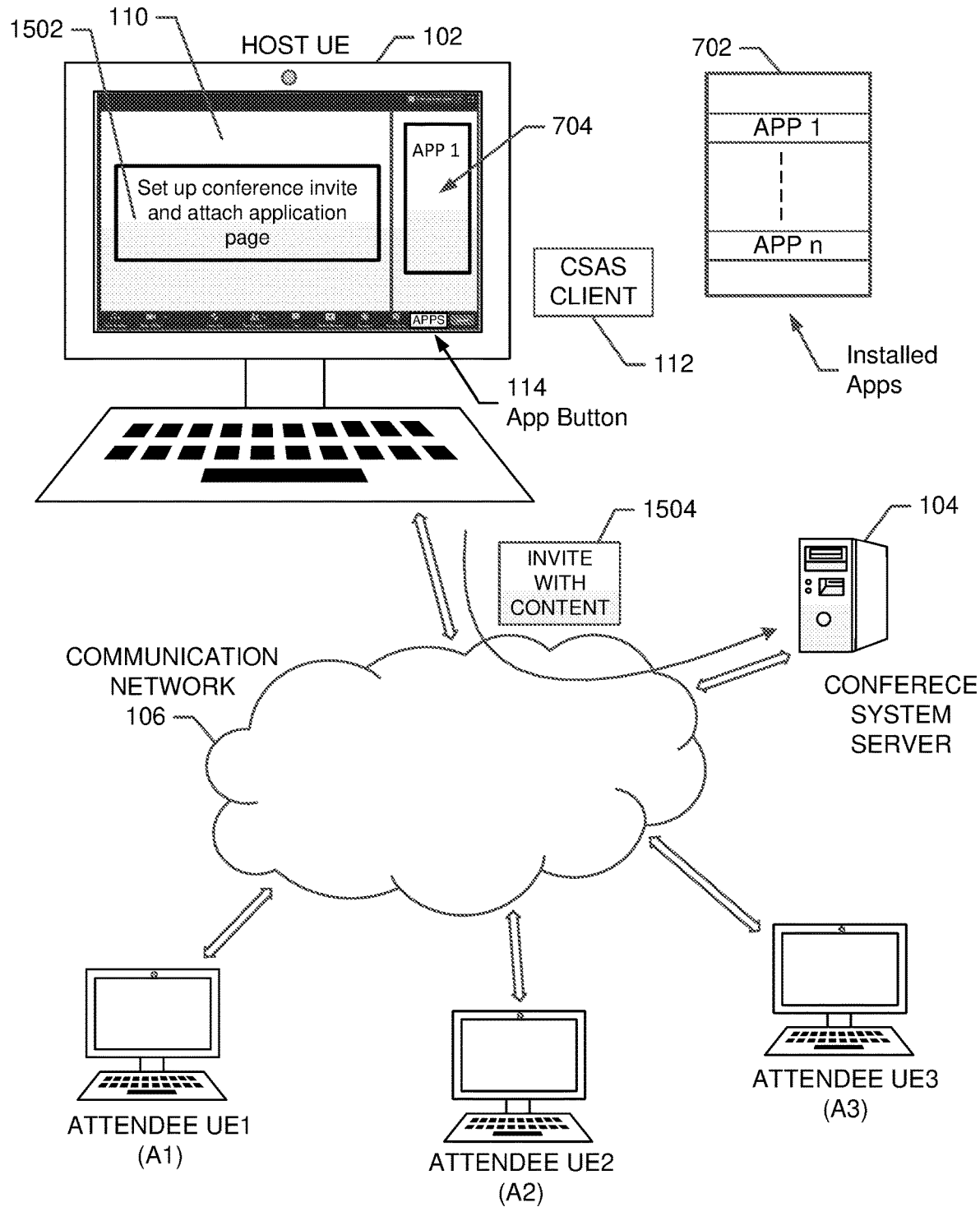
FIG. 15 a diagram illustrating an exemplary embodiment of a conference system with application support in which application content is attached to an instance of a network conference.

FIG. 15 a diagram illustrating an exemplary embodiment of a conference system with application support in which application content is attached to an instance of a network conference.

In an exemplary embodiment, the CSAS client application 112 is run on host equipment 102. Prior to initiating a network conference, the user of the host 102 selects the application button 114 to see the list installed applications 702. The user of the host 102 selects the application 704 to run. The user interacts with the application 704 to generate application content. The user then selects to generate a conference invitation 1502 to invite attendees to a network conference. The user attaches application content to the invitation. The user transmits the invitation and content 1504 to the network server 104. When the attendees receive the invention and content 1504, the attendees can view the attached content prior to the conference.

In an embodiment, the following functions are performed by embodiments of the CSAS client to attached application content to an instance of a network conference.

1. A user activates the CSAS client.

2. The user selects a conference application to run. For example, the user selects one of the previously installed conference applications 702.

3. The user interacts with the conference application as desired to perform some function of the application to generate application content.

4. The user generates a conference invitation and attached application content.

5. The user transmits the conference invitation and application content 1504 to the network server 104.

Figure 16:
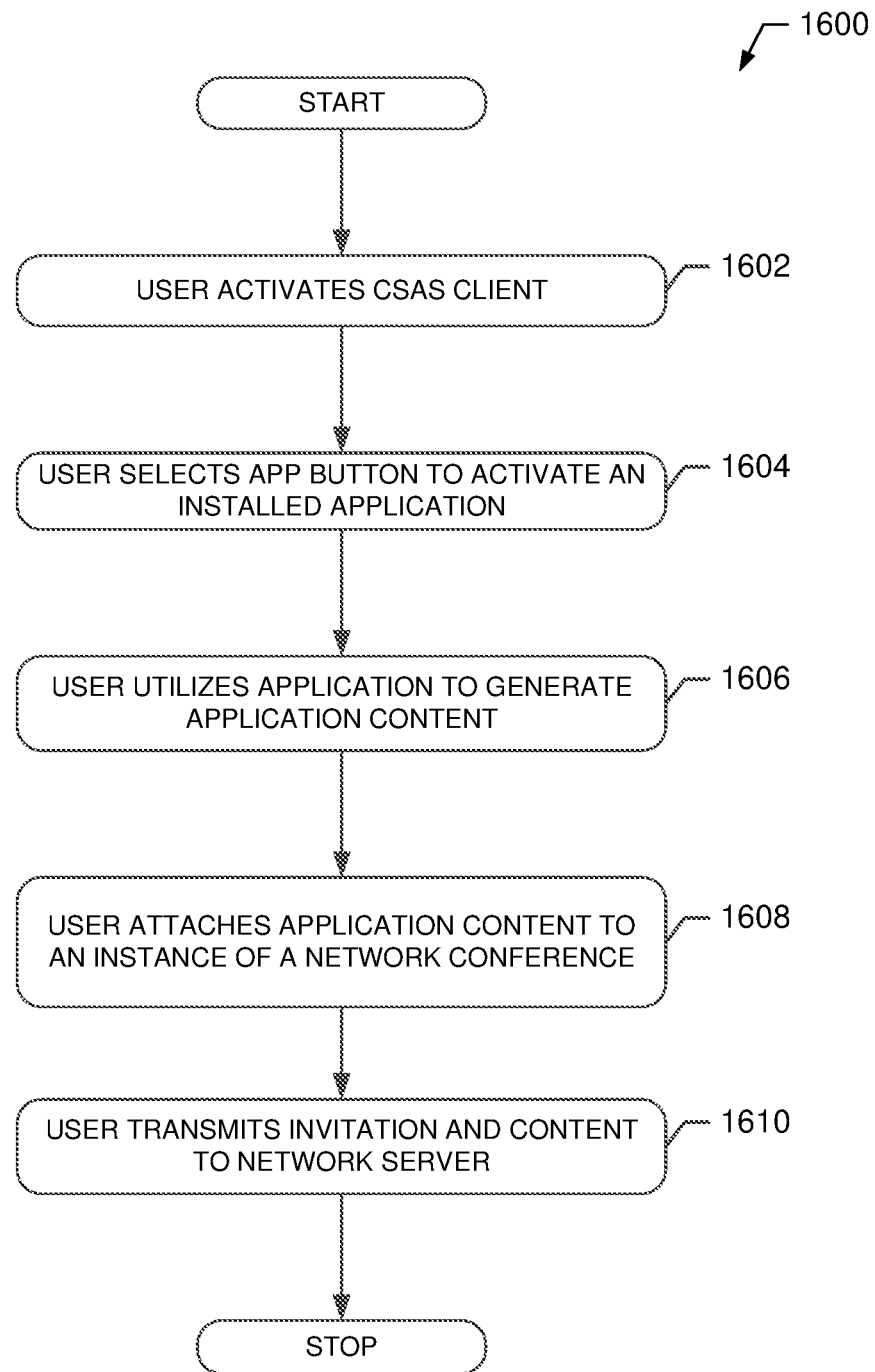
FIG. 16 shows an exemplary method for attaching application content to an instance of a network conference.

FIG. 16 shows an exemplary method 1600 for attaching conference application content to an instance of a network conference. For example, in an embodiment, the method 1600 is performed by the client application 112 running on the host 102 or any of the attendee UE (A1-A3) systems shown in FIG. 15.

At block 1602, a user activates the CSAS client on the device or system. For example, the user of the host 102 activates the CSAS client 112.

At block 1604, the user selects the application button to display a directory listing of installed applications. For example, the user of the host 102 selects the application button 114 to see the listing 702 of conference applications installed on the host 102 and selects an application to run.

At block 1606, the user utilizes the application to generate application content.

At block 1608, the user attaches application content to an instance of a network conference. For example, the user of the host 102 uses the CSAS client to generate an invitation 1502 to a network conference with attached the application content.

At block 1610, the CSAS client transmits invitation and content 1504 to the network server 104.

Thus, the method 1600 provides a method for attaching conference application content to an instance of a network conference. It should be noted that the operations of the method 1600 are exemplary and not limiting of the scope of the embodiments. Furthermore the operations of the method 1600 can be changed, deleted, rearranged, added to, or otherwise modified within the scope of the embodiments.

Figure 17:
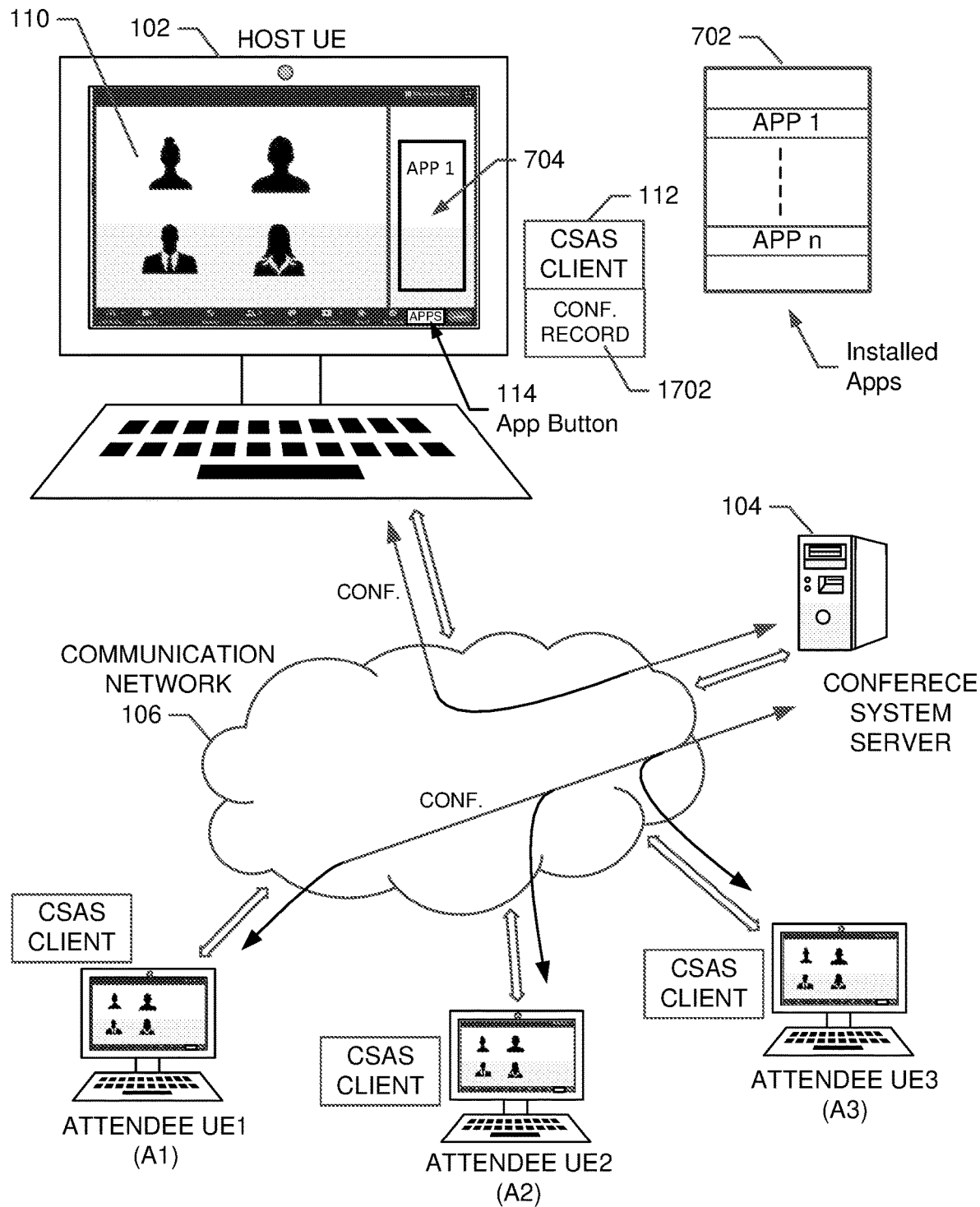
FIG. 17 shows a diagram illustrating an exemplary embodiment of a conference system with application support in which a record of application usage during a network conference is maintained.

FIG. 17 a diagram illustrating an exemplary embodiment of a conference system with application support in which a record of application usage during a network conference is maintained.

In an exemplary embodiment of a conference system with application support, the client application 112 is run on a host equipment 102 during a network conference. The client application 112 is also running on attendee computers A1-A3. The network server 104 facilitates the network conference over the communication network 106. For example, the client application 112 provides a network conference display 110 on the host system and the attendee systems during the network conference.

During the conference, the user of the host system 102 selects the conference application selector (button) 114 to view a listing 702 of installed conference applications. The user selects one or more of the conference applications to run during the conference. For example, the user select conference application 1 704 to run during the conference. The application 1 704 runs in a side panel on the right side of the conference display 110. During the conference the user can interact with the application 704 to take notes or make other entries depending on the functionality of the application. In an embodiment, the following functions to record the activities of the network conference are performed by embodiments of the CSAS.

1. A user activates the CSAS client and begin a conference recording 1702 to record events related to the user of the CSAS client and conference applications.

2. The user selects a conference application to run. For example, the user selects one of the previously installed conference applications 702.

3. The user interacts with the conference application as desired to perform some function of the application to generate application content.

4. The user initiates or joins a network conference and utilizes one or more conference applications before, during, or after the conference. For example, the CSAS can perform any or all of the application functions as shown in FIG. 2.

5. The user exists the conference and closes all conference applications.

6. The CSAS completes the conference record 1702 and saves these events on the host system 102.

Figure 18:
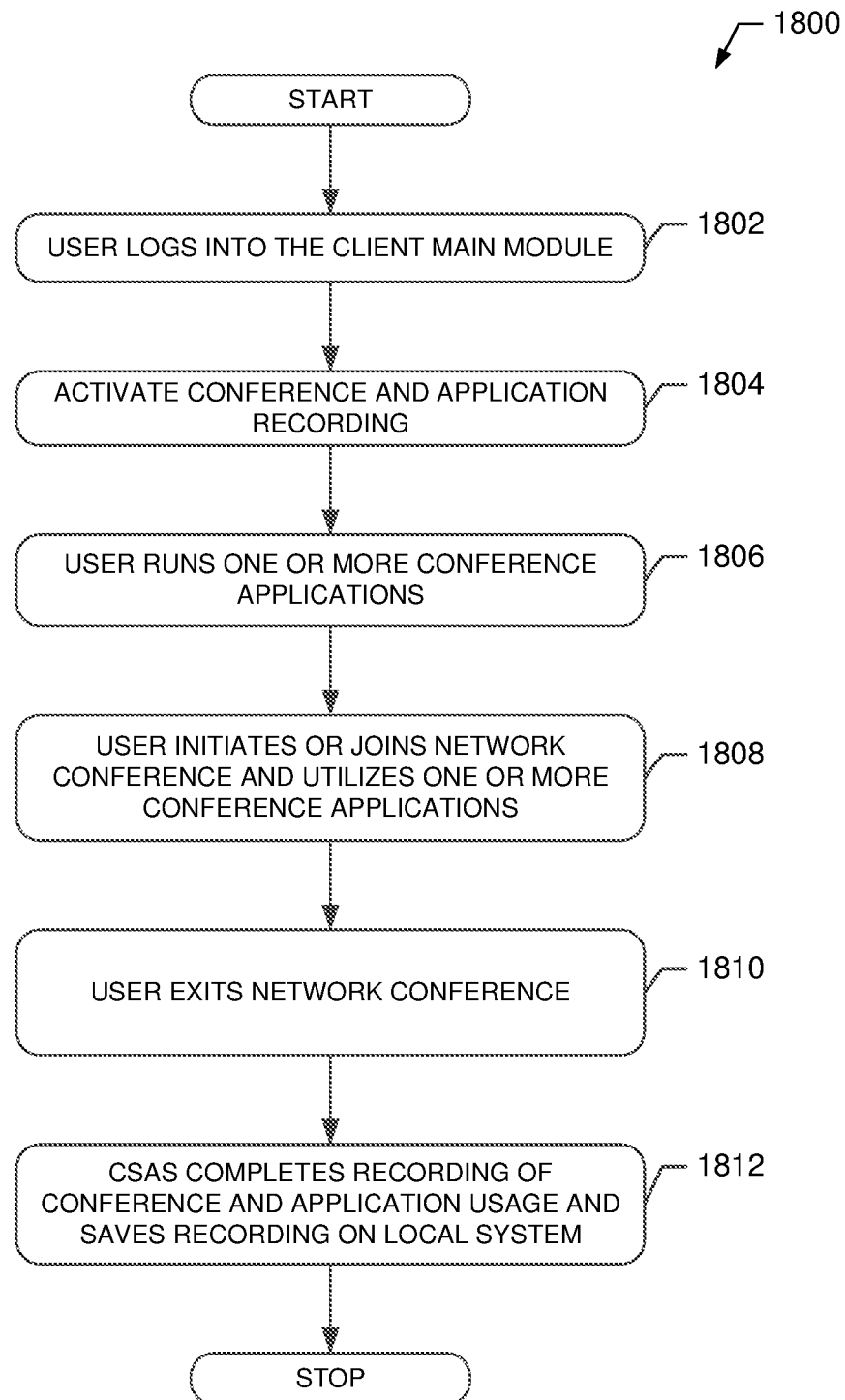
FIG. 18 shows an exemplary method for maintaining records of application usage during a network conference.

FIG. 18 shows an exemplary method 1800 for maintaining a record of application usage during a network conference. For example, in an embodiment, the method 1800 is performed by the client application 112 running on the host 102 or any of the attendee UE (A1-A3) systems shown in FIG. 17.

At block 1802, a user activates the CSAS client on the device or system. For example, the user of the host 102 activates the CSAS client 112.

At block 1804, the user activates conference recording. For example, the CSAS client receives user input to activate conference recording to recording conference activity and application usage.

At block 1806, the user runs one or more conference applications.

At block 1808, the user or the host 102 initiates or joins a network conference. During the network conference the user interact with one or more conference applications. The user may also provide input to the CSAS client to perform any or all of the functions shown in FIG. 2.

At block 1810, the user exits the network conference. For example, the user provides user input to the CSAS client to exit the network conference.

At block 1812, the CSAS completes recording of conference and application usage and saves recording on the local system. For example, the CSAS saves the conference recording 1702 on the host 102.

Thus, the method 1800 provides a method for operating a UE of a conference attendee to utilize a scene layout during a network conference. It should be noted that the operations of the method 1800 are exemplary and not limiting of the scope of the embodiments. Furthermore the operations of the method 1800 can be changed, deleted, rearranged, added to, or otherwise modified within the scope of the embodiments.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 404 or instructions memory 412. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise one or more buses. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, which carries the data to a memory, from which a processor retrieves and executes the instructions. The instructions may optionally be stored on a storage device either before or after execution by processor.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method comprising:
    initiating a conference system server configured to provide a network conference using a conference system with application support (CSAS) client application deployed to user equipment, the network conference including audio and video information exchange over a network;
    initiating an application store associated with the conference system server, the application store including a plurality of conference applications configured to provide functionality other than providing audio and video information exchange over the network;
    transmitting a conference application of the plurality of conference applications in the application store to the user equipment to cause installation of the conference application in association with the CSAS client application on the user equipment;
    configuring the CSAS client application on the user equipment to, in response to input to the CSAS client application, run the conference application before the CSAS client application joins a network conference, during the network conference, or after the CSAS client application leaves the network conference, as selected using the CSAS client application; and
    attaching an application page generated by the conference application to the network conference when the CSAS client application joins the network conference or during the network conference.

2. The method of claim 1, further comprising transmitting, by the CSAS client application using the user equipment, an invitation to the network conference, wherein the invitation includes the application page.

3. The method of claim 1, further comprising generating and storing a record of application activity for the conference application.

4. The method of claim 1, wherein transmitting the conference application of the plurality of conference applications further comprises transmitting the conference application in response to input received by the CSAS client application.

5. The method of claim 1, wherein the conference application is a web application and the method further comprises configuring the CSAS client application on the user equipment to, in response to input to the CSAS client application, run the conference application in a web browser before the CSAS client application joins a network conference, during the network conference, or after the CSAS client application leaves the network conference, as selected using the CSAS client application.

6. The method of claim 1, wherein the input to the CSAS client application comprises selection of the conference application from a list of conference applications installed on the user equipment.

7. A system comprising: a processor; and at least one memory device including instructions that are executable by the processor to cause the processor to:
    initiate a conference system server configured to provide a network conference using a conference system with application support (CSAS) client application deployed to user equipment, the network conference including audio and video information exchange over a network;
    initiate an application store associated with the conference system server, the application store including a plurality of conference applications configured to provide functionality other than providing audio and video information exchange over the network;
    transmit a conference application of the plurality of conference applications in the application store to the user equipment to cause installation of the conference application in association with the CSAS client application on the user equipment;
    configure the CSAS client application on the user equipment to, in response to input to the CSAS client application, run the conference application before the CSAS client application joins a network conference, during the network conference, or after the CSAS client application leaves the network conference, as selected using the CSAS client application; and attach an application page generated by the conference application to the network conference when the CSAS client application joins the network conference or during the network conference.

8. The system of claim 7, wherein the instructions are further executable by the processor to transmit, from the CSAS client application using the user equipment, an invitation to the network conference, wherein the invitation includes the application page.

9. The system of claim 7, wherein the instructions are further executable by the processor to generate and store a record of application activity for the conference application.

10. The system of claim 7, wherein the instructions are further executable by the processor to transmit the conference application in response to input received by the CSAS client application.

11. The system of claim 7, wherein the conference application is a web application and the instructions are further executable by the processor to configure the CSAS client application on the user equipment to, in response to input to the CSAS client application, run the conference application in a web browser before the CSAS client application joins a network conference, during the network conference, or after the CSAS client application leaves the network conference, as selected using the CSAS client application.

12. The system of claim 7, wherein the input to the CSAS client application comprises selection of the conference application from a list of conference applications installed on the user equipment.

13. A non-transitory computer-readable medium comprising code that is executable by a processor for causing the processor to:
- initiate a conference system server configured to provide a network conference using a conference system with application support (CSAS) client application deployed to user equipment, the network conference including audio and video information exchange over a network;
- initiate an application store associated with the conference system server, the application store including a plurality of conference applications configured to provide functionality other than providing audio and video information exchange over the network;
- transmit a conference application of the plurality of conference applications in the application store to the user equipment to cause installation of the conference application in association with the CSAS client application on the user equipment;
- configure the CSAS client application on the user equipment to, in response to input to the CSAS client application, run the conference application before the CSAS client application joins a network conference, during the network conference, or after the CSAS client application leaves the network conference, as selected using the CSAS client application; and
- attach an application page generated by the conference application to the network conference when the CSAS client application joins the network conference or during the network conference.

14. The non-transitory computer-readable medium of claim 13, wherein the code is further executable for causing the processor to transmit, from the CSAS client application using the user equipment, an invitation to the network conference, wherein the invitation includes the application page.

15. The non-transitory computer-readable medium of claim 13, wherein the code is further executable for causing the processor to generate and store a record of application activity for the conference application.

16. The non-transitory computer-readable medium of claim 13, wherein the code is further executable for causing the processor to transmit the conference application in response to input received by the CSAS client application.

17. The non-transitory computer-readable medium of claim 13, wherein the conference application is a web application and the code is further executable for causing the processor to configure the CSAS client application on the user equipment to, in response to input to the CSAS client application, run the conference application in a web browser before the CSAS client application joins a network conference, during the network conference, or after the CSAS client application leaves the network conference, as selected using the CSAS client application.

* * * * *